(12) United States Patent
Kesin

(10) Patent No.: US 9,898,528 B2
(45) Date of Patent: Feb. 20, 2018

(54) CONCEPT INDEXING AMONG DATABASE OF DOCUMENTS USING MACHINE LEARNING TECHNIQUES

(71) Applicant: Palantir Technologies Inc., Palo Alto, CA (US)

(72) Inventor: Max Kesin, Woodmere, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/159,622

(22) Filed: May 19, 2016

(65) Prior Publication Data

US 2016/0342681 A1 Nov. 24, 2016

Related U.S. Application Data

(63) Continuation of application No. 14/746,671, filed on Jun. 22, 2015, now Pat. No. 9,348,920.
(Continued)

(51) Int. Cl.
*G06F 17/30* (2006.01)
*G06N 99/00* (2010.01)

(52) U.S. Cl.
CPC .. *G06F 17/30675* (2013.01); *G06F 17/30011* (2013.01); *G06F 17/30017* (2013.01);
(Continued)

(58) Field of Classification Search
CPC ......... G06F 17/30554; G06F 17/30864; G06F 17/30011; G06F 17/30867
(Continued)

(56) References Cited

U.S. PATENT DOCUMENTS 5,109,399 A 4/1992 Thompson
5,329,108 A 7/1994 Lamoure
(Continued)

FOREIGN PATENT DOCUMENTS

AU 2014206155 12/2015
AU 2014250678 2/2016
(Continued)

OTHER PUBLICATIONS

US 8,712,906, 04/2014, Sprague et al. (withdrawn)
(Continued)

*Primary Examiner* — Shahid Alam
(74) *Attorney, Agent, or Firm* — Knobbe, Martens, Olson & Bear, LLP

(57) ABSTRACT

Systems and techniques for indexing and/or querying a database are described herein. Discrete sections and/or segments from documents may be determined by a concept indexing system. The segments may be indexed by concept and/or higher-level category of interest to a user. A user may query the segments by one or more concepts. The segments may be analyzed to rank the segments by statistical accuracy and/or relatedness to one or more particular concepts. The rankings may be used for presentation of search results in a user interface. Furthermore, segments and/or documents may be ranked based on recency decay functions that distinguish between segments that maintain their relevance over time in contrast with temporal segments whose relevance decays quicker over time, for example.

17 Claims, 20 Drawing Sheets

Related U.S. Application Data

(60) Provisional application No. 62/095,445, filed on Dec. 22, 2014, provisional application No. 62/133,871, filed on Mar. 16, 2015.

(52) U.S. Cl.
CPC .. *G06F 17/30554* (2013.01); *G06F 17/30589* (2013.01); *G06F 17/30613* (2013.01); *G06F 17/30696* (2013.01); *G06F 17/30707* (2013.01); *G06F 17/30734* (2013.01); *G06F 17/30864* (2013.01); *G06F 17/30867* (2013.01); *G06N 99/005* (2013.01)

(58) Field of Classification Search
USPC .................................................. 707/725
See application file for complete search history.

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,845,300 A | 12/1998 | Comer |
| 5,872,973 A | 2/1999 | Mitchell et al. |
| 5,897,636 A | 4/1999 | Kaeser |
| 6,057,757 A | 5/2000 | Arrowsmith et al. |
| 6,073,129 A | 6/2000 | Levine et al. |
| 6,091,956 A | 7/2000 | Hollenberg |
| 6,094,653 A | 7/2000 | Li et al. |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayana |
| 6,549,752 B2 | 4/2003 | Tsukamoto |
| 6,549,944 B1 | 4/2003 | Weinberg et al. |
| 6,560,620 B1 | 5/2003 | Ching |
| 6,567,936 B1 | 5/2003 | Yang et al. |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,194,680 B1 | 3/2007 | Roy et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,318,054 B2 | 1/2008 | Nomura et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,392,249 B1 | 6/2008 | Harris et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,761,407 B1 | 7/2010 | Stern |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,979,457 B1 | 7/2011 | Garman |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,095,582 B2 | 1/2012 | Cramer |

(56) References Cited

U.S. PATENT DOCUMENTS

| | | |
|---|---|---|
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,392,394 B1 | 3/2013 | Kumar et al. |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,812 B1 | 3/2014 | Ranjan |
| 8,688,573 B1 | 4/2014 | Rukonic et al. |
| 8,689,108 B1 | 4/2014 | Duffield et al. |
| 8,700,643 B1 | 4/2014 | Gossweiler |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,898,184 B1 | 11/2014 | Garman |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,135,658 B2 | 9/2015 | Sprague et al. |
| 9,146,954 B1 | 9/2015 | Boe et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,208,159 B2 | 12/2015 | Stowe et al. |
| 9,229,952 B1 | 1/2016 | Meacham et al. |
| 9,230,280 B1 | 1/2016 | Maag et al. |
| 9,256,664 B2 | 2/2016 | Chakerian et al. |
| 9,280,532 B2 | 3/2016 | Cicerone |
| 9,344,447 B2 | 5/2016 | Cohen et al. |
| 9,348,920 B1 | 5/2016 | Kesin |
| 9,367,872 B1 | 6/2016 | Visbal et al. |
| 9,535,974 B1 | 1/2017 | Kesin et al. |
| 9,547,693 B1 | 1/2017 | Sheasby et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0013781 A1 | 1/2002 | Petersen et al. |
| 2002/0033848 A1 | 3/2002 | Sciammarella et al. |
| 2002/0065708 A1 | 5/2002 | Senay et al. |
| 2002/0083039 A1 | 6/2002 | Ferrari |
| 2002/0091694 A1 | 7/2002 | Hrle et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0169759 A1 | 11/2002 | Kraft et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0036848 A1 | 2/2003 | Sheha et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |

(56) References Cited

U.S. PATENT DOCUMENTS

| | | |
|---|---|---|
| 2003/0172014 A1 | 9/2003 | Quackenbush et al. |
| 2003/0200217 A1 | 10/2003 | Ackerman |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0160309 A1 | 8/2004 | Stilp |
| 2004/0163039 A1 | 8/2004 | McPherson et al. |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0097441 A1 | 5/2005 | Herbach et al. |
| 2005/0108063 A1 | 5/2005 | Madill et al. |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0136402 A1 | 6/2006 | Lee et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0130206 A1 | 6/2007 | Zhou et al. |
| 2007/0143253 A1 | 6/2007 | Kostamaa et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0294643 A1 | 12/2007 | Kyle |
| 2008/0015970 A1 | 1/2008 | Brookfield et al. |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0071731 A1 | 3/2008 | Ma et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0104149 A1 | 5/2008 | Vishniac et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Worley et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |

(56) References Cited

U.S. PATENT DOCUMENTS

| | | |
|---|---|---|
| 2008/0288306 A1 | 11/2008 | MacIntyre et al. |
| 2008/0288425 A1 | 11/2008 | Posse et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0024589 A1 | 1/2009 | Sood et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037417 A1 | 2/2009 | Shankar et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Hamilton Whyte |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271359 A1 | 10/2009 | Bayliss |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0036831 A1 | 2/2010 | Vemuri et al. |
| 2010/0042922 A1 | 2/2010 | Bradeteanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0077481 A1 | 3/2010 | Polyakov et al. |
| 2010/0077483 A1 | 3/2010 | Stolfo et al. |
| 2010/0082541 A1 | 4/2010 | Kottomtharayil |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114817 A1 | 5/2010 | Broeder et al. |
| 2010/0114831 A1 | 5/2010 | Gilbert et al. |
| 2010/0114887 A1* | 5/2010 | Conway .............. G06F 3/0237 707/737 |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0161735 A1 | 6/2010 | Sharma |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0055140 A1 | 3/2011 | Roychowdhury |
| 2011/0060753 A1 | 3/2011 | Shaked et al. |
| 2011/0061013 A1 | 3/2011 | Billicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161137 A1 | 6/2011 | Ubalde et al. |
| 2011/0167054 A1 | 7/2011 | Bailey et al. |
| 2011/0167105 A1 | 7/2011 | Ramakrishnan et al. |

(56) References Cited

U.S. PATENT DOCUMENTS

| | | |
|---|---|---|
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0178842 A1 | 7/2011 | Rane et al. |
| 2011/0181598 A1 | 7/2011 | O'Neall et al. |
| 2011/0184813 A1 | 7/2011 | Barne et al. |
| 2011/0185316 A1 | 7/2011 | Reid et al. |
| 2011/0196737 A1 | 8/2011 | Vadlamani et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0258190 A1 | 10/2011 | Chen et al. |
| 2011/0258242 A1 | 10/2011 | Eidson et al. |
| 2011/0270604 A1 | 11/2011 | Qi et al. |
| 2011/0270705 A1 | 11/2011 | Parker |
| 2011/0270812 A1 | 11/2011 | Ruby |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314546 A1 | 12/2011 | Aziz et al. |
| 2012/0004904 A1 | 1/2012 | Shin et al. |
| 2012/0005581 A1 | 1/2012 | Turner et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0136804 A1 | 1/2012 | Lucia |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0116828 A1 | 5/2012 | Shannon |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131107 A1 | 5/2012 | Yost |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0150791 A1 | 6/2012 | Willson |
| 2012/0158626 A1 | 6/2012 | Zhu et al. |
| 2012/0159307 A1 | 6/2012 | Chung et al. |
| 2012/0159312 A1 | 6/2012 | Mital et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203584 A1 | 8/2012 | Mishor et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0278273 A1 | 11/2012 | Fang |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg |
| 2013/0151453 A1 | 6/2013 | Bhanot et al. |
| 2013/0157234 A1 | 6/2013 | Gulli et al. |
| 2013/0159340 A1 | 6/2013 | Blanco et al. |
| 2013/0160120 A1 | 6/2013 | Malaviya et al. |

(56) References Cited

U.S. PATENT DOCUMENTS

| | | | |
|---|---|---|---|
| 2013/0166348 A1 | 6/2013 | Scotto | |
| 2013/0166480 A1 | 6/2013 | Popescu et al. | |
| 2013/0166550 A1 | 6/2013 | Buchmann et al. | |
| 2013/0176321 A1 | 7/2013 | Mitchell et al. | |
| 2013/0179420 A1 | 7/2013 | Park et al. | |
| 2013/0185245 A1 | 7/2013 | Anderson | |
| 2013/0185307 A1 | 7/2013 | El-Yaniv et al. | |
| 2013/0185320 A1 | 7/2013 | Iwasaki et al. | |
| 2013/0197925 A1 | 8/2013 | Blue | |
| 2013/0211985 A1 | 8/2013 | Clark et al. | |
| 2013/0224696 A1 | 8/2013 | Wolfe et al. | |
| 2013/0225212 A1 | 8/2013 | Khan | |
| 2013/0226318 A1 | 8/2013 | Procyk | |
| 2013/0226953 A1 | 8/2013 | Markovich et al. | |
| 2013/0232045 A1 | 9/2013 | Tai et al. | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0246597 A1 | 9/2013 | Iizawa et al. | |
| 2013/0251233 A1 | 9/2013 | Yang et al. | |
| 2013/0208565 A1 | 10/2013 | Castellanos et al. | |
| 2013/0262527 A1 | 10/2013 | Hunter et al. | |
| 2013/0263019 A1 | 10/2013 | Castellanos et al. | |
| 2013/0267207 A1 | 10/2013 | Hao et al. | |
| 2013/0268520 A1 | 10/2013 | Fisher et al. | |
| 2013/0276799 A1 | 10/2013 | Davidson | |
| 2013/0279757 A1 | 10/2013 | Kephart | |
| 2013/0282696 A1 | 10/2013 | John et al. | |
| 2013/0290011 A1 | 10/2013 | Lynn et al. | |
| 2013/0290825 A1 | 10/2013 | Arndt et al. | |
| 2013/0297619 A1 | 11/2013 | Chandrasekaran et al. | |
| 2013/0304770 A1* | 11/2013 | Boero | G06F 17/30321 707/812 |
| 2013/0311375 A1 | 11/2013 | Priebatsch | |
| 2013/0318060 A1 | 11/2013 | Chang et al. | |
| 2013/0318594 A1 | 11/2013 | Hoy et al. | |
| 2013/0318604 A1 | 11/2013 | Coates et al. | |
| 2013/0339218 A1 | 12/2013 | Subramanian et al. | |
| 2013/0339514 A1 | 12/2013 | Crank et al. | |
| 2014/0006109 A1 | 1/2014 | Callioni et al. | |
| 2014/0012796 A1 | 1/2014 | Petersen et al. | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |
| 2014/0040371 A1 | 2/2014 | Gurevich et al. | |
| 2014/0047319 A1 | 2/2014 | Eberlein | |
| 2014/0047357 A1 | 2/2014 | Alfaro et al. | |
| 2014/0058763 A1 | 2/2014 | Zizzamia et al. | |
| 2014/0058914 A1 | 2/2014 | Song et al. | |
| 2014/0059038 A1 | 2/2014 | McPherson et al. | |
| 2014/0067611 A1 | 3/2014 | Adachi et al. | |
| 2014/0068487 A1 | 3/2014 | Steiger et al. | |
| 2014/0074855 A1 | 3/2014 | Zhao et al. | |
| 2014/0081652 A1 | 3/2014 | Klindworth | |
| 2014/0095273 A1 | 4/2014 | Tang et al. | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0129261 A1 | 5/2014 | Bothwell et al. | |
| 2014/0136285 A1 | 5/2014 | Carvalho | |
| 2014/0143009 A1 | 5/2014 | Brice et al. | |
| 2014/0149130 A1 | 5/2014 | Getchius | |
| 2014/0149272 A1 | 5/2014 | Hirani et al. | |
| 2014/0149436 A1 | 5/2014 | Bahrami et al. | |
| 2014/0156484 A1 | 6/2014 | Chan et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0181833 A1 | 6/2014 | Bird et al. | |
| 2014/0189536 A1 | 7/2014 | Lange et al. | |
| 2014/0189870 A1 | 7/2014 | Singla et al. | |
| 2014/0195515 A1 | 7/2014 | Baker et al. | |
| 2014/0195887 A1 | 7/2014 | Ellis et al. | |
| 2014/0214579 A1 | 7/2014 | Shen et al. | |
| 2014/0222521 A1 | 8/2014 | Chait | |
| 2014/0222793 A1 | 8/2014 | Sadkin et al. | |
| 2014/0229554 A1 | 8/2014 | Grunin et al. | |
| 2014/0244388 A1 | 8/2014 | Manouchehri et al. | |
| 2014/0258246 A1 | 9/2014 | Lo Faro et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0283067 A1 | 9/2014 | Call et al. | |
| 2014/0310266 A1 | 10/2014 | Greenfield | |
| 2014/0310282 A1 | 10/2014 | Sprague et al. | |
| 2014/0316911 A1 | 10/2014 | Gross | |
| 2014/0324876 A1 | 10/2014 | Konik et al. | |
| 2014/0330845 A1 | 11/2014 | Feldschuh | |
| 2014/0331119 A1 | 11/2014 | Dixon et al. | |
| 2014/0333651 A1 | 11/2014 | Cervelli et al. | |
| 2014/0337772 A1 | 11/2014 | Cervelli et al. | |
| 2014/0344230 A1 | 11/2014 | Krause et al. | |
| 2014/0344231 A1 | 11/2014 | Stowe et al. | |
| 2014/0351070 A1 | 11/2014 | Christner et al. | |
| 2014/0358829 A1 | 12/2014 | Hurwitz | |
| 2014/0366132 A1 | 12/2014 | Stiansen et al. | |
| 2014/0379755 A1 | 12/2014 | Kuriakose et al. | |
| 2014/0379812 A1 | 12/2014 | Paul et al. | |
| 2015/0019394 A1 | 1/2015 | Unser et al. | |
| 2015/0039886 A1 | 2/2015 | Kahol et al. | |
| 2015/0046870 A1 | 2/2015 | Goldenberg et al. | |
| 2015/0067533 A1 | 3/2015 | Volach | |
| 2015/0073929 A1 | 3/2015 | Psota et al. | |
| 2015/0073954 A1 | 3/2015 | Braff | |
| 2015/0089353 A1 | 3/2015 | Folkening | |
| 2015/0089424 A1 | 3/2015 | Duffield et al. | |
| 2015/0095773 A1 | 4/2015 | Gonsalves et al. | |
| 2015/0100897 A1 | 4/2015 | Sun et al. | |
| 2015/0100907 A1 | 4/2015 | Erenrich et al. | |
| 2015/0106347 A1 | 4/2015 | McGrew et al. | |
| 2015/0106379 A1 | 4/2015 | Elliot et al. | |
| 2015/0112956 A1 | 4/2015 | Chang et al. | |
| 2015/0134666 A1 | 5/2015 | Gattiker et al. | |
| 2015/0135256 A1 | 5/2015 | Hoy et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178825 A1 | 6/2015 | Huerta | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188872 A1 | 7/2015 | White | |
| 2015/0212663 A1 | 7/2015 | Papale et al. | |
| 2015/0213043 A1 | 7/2015 | Ishii et al. | |
| 2015/0213134 A1 | 7/2015 | Nie et al. | |
| 2015/0227295 A1 | 8/2015 | Meiklejohn et al. | |
| 2015/0235334 A1 | 8/2015 | Wang et al. | |
| 2015/0242397 A1 | 8/2015 | Zhuang | |
| 2015/0261817 A1 | 9/2015 | Harris et al. | |
| 2015/0309719 A1 | 10/2015 | Ma et al. | |
| 2015/0317342 A1 | 11/2015 | Grossman et al. | |
| 2015/0324868 A1 | 11/2015 | Kaftan et al. | |
| 2015/0338233 A1 | 11/2015 | Cervelli et al. | |
| 2015/0341467 A1 | 11/2015 | Lim et al. | |
| 2015/0347903 A1 | 12/2015 | Saxena et al. | |
| 2015/0378996 A1 | 12/2015 | Kesin et al. | |
| 2015/0379413 A1 | 12/2015 | Robertson et al. | |
| 2016/0004667 A1 | 1/2016 | Chakerian et al. | |
| 2016/0004764 A1 | 1/2016 | Chakerian et al. | |
| 2016/0034470 A1 | 2/2016 | Sprague et al. | |
| 2016/0034545 A1 | 2/2016 | Shankar et al. | |
| 2016/0034555 A1 | 2/2016 | Rahut et al. | |
| 2016/0048937 A1 | 2/2016 | Mathura et al. | |
| 2016/0062555 A1 | 3/2016 | Ward et al. | |
| 2016/0098173 A1 | 4/2016 | Slawinski et al. | |
| 2016/0147730 A1 | 5/2016 | Cicerone | |
| 2016/0180451 A1 | 6/2016 | Visbal et al. | |

(56) References Cited

U.S. PATENT DOCUMENTS

| | | | |
|---|---|---|---|
| 2016/0180557 | A1 | 6/2016 | Yousaf et al. |
| 2016/0210195 | A1 | 7/2016 | Sinha |
| 2017/0046349 | A1 | 2/2017 | Shankar et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 0652513 | 5/1995 |
| EP | 1191463 | 3/2002 |
| EP | 1672527 | 6/2006 |
| EP | 2487610 | 8/2012 |
| EP | 2551799 | 1/2013 |
| EP | 2555126 | 2/2013 |
| EP | 2555153 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963577 | 1/2016 |
| EP | 2963595 | 1/2016 |
| EP | 2985729 | 2/2016 |
| EP | 3018879 | 5/2016 |
| EP | 3037991 | 6/2016 |
| EP | 3038046 | 6/2016 |
| GB | 2513247 | 10/2014 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2002/065353 | 8/2002 |
| WO | WO 2005/104736 | 11/2005 |
| WO | WO 2005/116851 | 12/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2012/025915 | 3/2012 |
| WO | WO 2013/010157 | 1/2013 |
| WO | WO 2013/102892 | 7/2013 |
| WO | WO 2013/126281 | 8/2013 |

OTHER PUBLICATIONS

US 8,725,631, 05/2014, Sprague et al. (withdrawn)
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http://finsolinc.com/ANTI-MONEY%20LAUNDERING%20TRAININING%20GUIDES.pdf.
"The FASTA Program Package," fasta-36.3.4, Mar. 25, 2011, pp. 29.
"Using Whois Based Geolocation and Google Maps API for Support Cybercrime Investigations," http://wseas.us/e-library/conferences/2013/Dubrovnik/TELECIRC/TELECIRC-32.pdf.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Alur et al., "Chapter 2: IBM InfoSphere DataStage Stages," IBM InfoSphere DataStage Data Flow and Job Design, Jul. 1, 2008, pp. 35-137.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "BackTult—JD Edwards One World Version Control System", in 1 page, Jul. 23, 2007.
Baker et al., "The Development of a Common Enumeration of Vulnerabilities and Exposures," Presented at the Second International Workshop on Recent Advances in Intrusion Detection, Sep. 7-9, 1999, pp. 35.
Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chang et al., "A new multi-search engine for querying data through an Internet search service on CORBA", Computer Networks, vol. 34, Issue 3, Sep. 2000, pp. 467-480.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

(56) References Cited

OTHER PUBLICATIONS

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Golmohammadi et al., "Data Mining Applications for Fraud Detection in Securities Market," Intelligence and Security Informatics Conference (EISIC), 2012 European, IEEE, Aug. 22, 2012, pp. 107-114.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "BotMiner: Clustering Analysis of Network Traffice for Protocol-and-Structure-Independent Botnet Detection," USENIX Security Symposium, 2008, 17 pages.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hodge et al., "A Survey of Outlier Detection Methodologies," Artificial Intelligence Review, vol. 22, No. 2, Oct. 1, 2004.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Jelen, Bill, "Excel 2013 in Depth, Video Enhanced Edition," Jan. 25, 2013.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Li et al., "Identifying the Signs of Fraudulent Accounts using Data Mining Techniques," Computers in Human Behavior, vol. 28, No. 3, Jan. 16, 2012.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.

Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Nolan et al., "MCARTA: A Malicious Code Automated Run-Time Analysis Framework," Homeland Security (HST) 2012 IEEE Conference on Technologies for, Nov. 13, 2012, pp. 13-17.
Olanoff, Drew, "Deep Dive with the New Google Maps for Desktop with Google Earth Integration, It's More than Just a Utility," retrieved from the internet: http://web.archive.org/web/20130515230641/http://techcrunch.com/2013/05/15/deep-dive-with-the-new-google-maps-for-desktop-with-google-earth-integration-its-more-than-just-a-utility/, May 15, 2013, pp. 1-6.
Palantir Technolgies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Quartert FS "Resource Center," Oct. 16, 2014, retrieved from https://web.archive.org/web/20141016044306/http://quartetfs.com/resource-center/white-papers retrieved May 3, 2016.
Rouse, Margaret, "OLAP Cube," <http://searchdatamanagement.techtarget.com/definition/OLAP-cube>, Apr. 28, 2012, pp. 16.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sirotkin et al., "Chapter 13: The Processing of Biological Sequence Data at NCBI," The NCBI Handbook, Oct. 2002, pp. 1-11.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wikipedia, "Mobile Web," Jan. 23, 2015, retrieved from the internet on Mar. 15, 2016 https://en.wikipedia.org/w/index.php?title=Mobile_Web&oldid=643800164.
Wright et al., "Palantir Technologies VAST 2010 Challenge Text Records_Investigations into Arms Dealing," Oct. 29, 2010, pp. 1-10.
Yang et al., "Retroactive Answering of Search Queries", WWW 2006 Edinburgh, Scotland, May 23-26, 2006, pp. 457-466.
Notice of Acceptance for Australian Patent Application No. 2014250678 dated Oct. 7, 2015.

(56) References Cited

OTHER PUBLICATIONS

Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 13/247,987 dated Mar. 17, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/148,568 dated Aug. 26, 2015.
Notice of Allowance for U.S. Appl. No. 14/192,767 dated Apr. 20, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/319,765 dated Nov. 25, 2016.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Notice of Allowance for U.S. Appl. No. 14/581,920 dated Sep. 2, 2016.
Notice of Allowance for U.S. Appl. No. 14/616,080 dated Apr. 2, 2015.
Notice of Allowance for U.S. Appl. No. 14/734,772 dated Apr. 27, 2016.
Notice of Allowance for U.S. Appl. No. 14/746,671 dated Jan. 21, 2016.
Notice of Allowance for U.S. Appl. No. 14/849,454 dated May 25, 2016.
Notice of Allowance for U.S. Appl. No. 14/923,364 dated May 6, 2016.
Notice of Allowance for U.S. Appl. No. 14/948,009 dated May 6, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 19, 2016.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15156004.2 dated Aug. 24, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15180515.7 dated Dec. 14, 2015.
Official Communication for European Patent Application No. 15183721.8 dated Nov. 23, 2015.
Official Communication for European Patent Application No. 15193287.8 dated Apr. 1, 2016.
Official Communication for European Patent Application No. 15201727.3 dated May 23, 2016.
Official Communication for European Patent Application No. 15201924.6 dated Apr. 25, 2016.
Official Communication for European Patent Application No. 15202090.5 dated May 13, 2016.
Official Communication for European Patent Application No. 16152984.7 dated Mar. 24, 2016.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012433 dated Mar. 11, 2016.

(56) References Cited

OTHER PUBLICATIONS

Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Jun. 3, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/578,389 dated Apr. 22, 2016.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/580,218 dated Jun. 7, 2016.
Official Communication for U.S. Appl. No. 14/581,920 dated Mar. 1, 2016.

(56) References Cited

OTHER PUBLICATIONS

Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/645,304 dated Jan. 25, 2016.
Official Communication for U.S. Appl. No. 14/698,432 dated Jun. 3, 2016.
Official Communication for U.S. Appl. No. 14/726,211 dated Apr. 5, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/841,338 dated Feb. 18, 2016.
Official Communication for U.S. Appl. No. 14/857,071 dated Mar. 2, 2016.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
Official Communication for U.S. Appl. No. 14/961,830 dated May 20, 2016.
Official Communication for U.S. Appl. No. 14/996,179 dated May 20, 2016.
Official Communication for U.S. Appl. No. 15/072,174 dated Jun. 1, 2016.
Restriction Requirement for U.S. Appl. No. 14/857,071 dated Dec. 11, 2015.
"Apache HBase," http://hbase.apache.org/ printed Sep. 14, 2011 in 1 page.
"BackTult—JD Edwards One World Version Control System," printed Jul. 23, 2007 in 1 page.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The Apache Cassandra Project," http://cassandra.apache.org/ Printed Sep. 14, 2011 in 3 pages.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Anjewierden et al., "Automatic indexing of PDF Documents with Ontologies", Social Science Informatics, University of Amsterdam, The Netherlands, Jun. 11, 2001, pp. 8.
Antoshenkov, Gennady, "Dictionary-Based Order-Preserving String Compression," The VLDB Journal, 1997, vol. 6, pp. 26-39.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 12.
Bernstein et al., "Hyder—A Transactional Record Manager for Shared Flash," 5th Biennial Conference on Innovative Data Systems Research (CIDR '11), Jan. 9-12, 2011, Asilomar, California, pp. 12.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chang et al., "Bigtable: A Distributed Storage System for Structured Data", Google, Inc., OSDI'06: Seventh Symposium on Operating System Design and Implementation, Seattle, WA, Nov. 2006, pp. 14.
Chaudhuri et al., "An Overview of Business Intelligence Technology," Communications of the ACM, Aug. 2011, vol. 54, No. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn et al., "Semi-supervised Clustering with User Feedback," Constrained Clustering: Advances in Algorithms, Theory, and Applications 4.1, 2003, pp. 17-32.
Countly Mobile Analytics, http://count.ly/ Printed Jul. 18, 2013 in 9 pages.
Devanbu et al., "Authentic Third-party Data Publication," 2000, pp. 19, http://www.cs.ucdavis.edu/~devanbu/authdbpub.pdf.
Distimo—App Analytics, http://www.distimo.com/app-analytics Printed Jul. 18, 2013 in 5 pages.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Elmasri et al., "Fundamentals of Database Systems," 2004, Fourth Edition, pp. 455-491.
Flurry Analytics, http://www.flurry.com/ Printed Jul. 18, 2013 in 14 pages.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hansen et al, "Analyzing Social Media Networks with NodeXL: Insights from a Connected World", Chapter 4, pp. 53-67 and Chapter 10, pp. 143-164, published Sep. 2010.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services" HiPC 2006, LNCS 4297, pp. 277-288, 2006.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

(56) References Cited

OTHER PUBLICATIONS

Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Kontagent Mobile Analytics, http://www.kontagent.com/ Printed Jul. 18, 2013 in 9 pages.
Localytics—Mobile App Marketing & Analytics, http://www.localytics.com/ Printed Jul. 18, 2013 in 12 pages.
Manno et al., "Introducing Collaboration in Single-user Applications through the Centralized Control Architecture," 2010, pp. 10.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Mixpanel—Mobile Analytics, https://mixpanel.com/ Printed Jul. 18, 2013 in 13 pages.
Niepert et al., "A Dynamic Ontology for a Dynamic Reference Work", Joint Conference on Digital Libraries, Jun. 17-22, 2007, Vancouver, British Columbia, Canada, pp. 1-10.
Nierman, "Evaluating Structural Similarity in XML Documents," 2002, 6 pages.
Open Web Analytics (OWA), http://www.openwebanalytics.com/ Printed Jul. 19, 2013 in 5 pages.
Peng et al., "Large-scale Incremental Processing Using Distributed Transactions and Notifications" Proceedings of the 9th USENIX Symposium on Operating Systems Design and Implementation, USENIX, 2010, pp. 14.
Piwik—Free Web Analytics Software. http://piwik.org/ Printed Jul. 19, 2013 in18 pages.
Quest, "Toad for ORACLE 11.6—Guide to Using Toad," Sep. 24, 2012, pp. 1-162.
Sigrist et al., "PROSITE, a Protein Domain Database for Functional Characterization and Annotation," Nucleic Acids Research 38.Suppl 1, 2010, pp. D161-D166.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
Thomson et al., "The Case for Determinism in Database Systems." The 36th International Conference on Very Large Data Bases, Sep. 13-17, 2010, Singapore, Proceedings of the VLDB Endowment, vol. 3, No. 1, pp. 11.
trak.io, http://trak.io/ printed Jul. 18, 2013 in 3 pages.
UserMetrix, http://usermetrix.com/android-analytics printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wollrath et al., "A Distributed Object Model for the Java System," Conference on Object-Oriented Technologies and Systems, Jun. 17-21, 1996, pp. 219-231.
Yang et al., "HTML Page Analysis Based on Visual Cues," 2001, pp. 859-864.
Notice of Allowance for U.S. Appl. No. 13/196,788 dated Dec. 18, 2015.
Notice of Allowance for U.S. Appl. No. 13/826,228 dated Mar. 27, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/278,963 dated Sep. 2, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/451,221 dated Aug. 4, 2015.
Notice of Allowance for U.S. Appl. No. 14/479,863 dated Mar. 31, 2015.
Notice of Allowance for U.S. Appl. No. 14/504,103 dated May 18, 2015.
Notice of Allowance for U.S. Appl. No. 14/552,336 dated Nov. 3, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14191540.5 dated May 27, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 151832721.8 dated Nov. 23, 2015.
Official Communication for European Patent Application No. 15184764.7 dated Dec. 14, 2015.
Official Communication for European Patent Application No. 15201881.8 dated May 23, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012436 dated Nov. 6, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.

(56) References Cited

OTHER PUBLICATIONS

Official Communication for New Zealand Patent Application No. 628161 dated Aug. 25, 2014.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/278,963 dated Jan. 30, 2015.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/451,221 dated Oct. 21, 2014.
Official Communication for U.S. Appl. No. 14/451,221 dated Apr. 6, 2015.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/578,389 dated Oct. 21, 2015.
Official Communication for U.S. Appl. No. 14/580,218 dated Jun. 26, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Sep. 28, 2015.
Official Communication for U.S. Appl. No. 14/842,734 dated Nov. 19, 2015.

* cited by examiner

300

CA Employment — 312

316

310 { It was the year 1775 and month of January. Spiritual revelations were conced to — 318
England at that favourd period, as at this. Mrs. Southcott had recently attained her five-
and-twentieth blessed birthday, of whom a prophetic private in the...

330          314
       CA's Brain    Deficit

320 { France, less favoured on the whole as to matters spiritual than her sister of the shield and
350A                    350B
trident, rolled with exceeding smoothness down hill, making paper money and spending it. Under the guidance of her Chiristian pastors, she entertained herself, besides, with such
350C
humane achievements as sentencing a youth to have his hands cut off, his tongue torn out
350D
with pincers, and his body burned alive, because he had not kneeled down in the rain to
350E
do honour to a dirty procession of monks which passed within his view, at a distance of
350F  350G
some fifty or sixty yards. It is likely enough that, rooted in the woods of France,
350H God
350I Page 1 of 30

FIG. 3

400 — 402 — CA Monthly

Monthly      Updates

410A { Update 1

410B { Update 2

CA in tech

420 {
That, it was certain the prisoner had, for longer than that, been in the habit of passing and repassing between France and England, on secret business of wich he
    450A      450B
could give no honest account. That, if it were in the nature of traitorous ways to thrive(which happily it never was), the real wickedness and guilt of his business might have remained undiscovered. That Providence, however, had put it into the
                                         450C
heart of a person who was beyond fear and beyond reproach, to fert out the nature of the prisoner's schemes, and, struck with horror, to disclose them to his Majesty's Chief Secretary of State and most honourable Privy Council. That, this
                                                                          450D
patriot woul be produced before them. That, his position and attitude were, on the whole, sublime. That, he had been theprisoner's friend, but, at once in an
       450E
auspicious and an evil hour detecting his infamy, had resolved to immolate the traitor he could no longer cherish in his bosom, on the sacred altar of his
                                                                    450F
country. That, if statues were decreed in Britain, as in ancient Greece an Rome,
                                         450G
to public benefactors, this shining citizen would assuredly have had one. That, as they were not so decreed, he probably would not have one, That, Virtue, as had been
                                                                              450H
observed by the poets (in many passages which he well knew the jury would have,
                                   450I
word for word, at the tips of their tongues; whereat the jury's countenances...

Such law should apply to Alaska. It is now proposed to dispose of
  1502A           1504A
agricultural lands as such, and at the same time to reserve for other
                          1508
disposition the treasure of coal and oil in the United States. This may
                 1502B 1502C      1504B
be best accomplished by separating the right to mine from the title to the surface in Alaska, giving the necessary use of so much of the latter
              1504C
as may be required for the extraction of the deposits. The surface
                                          1502D
might be disposed of as agricultural land under the general agricultural statutes in America, while the coal or other mineral could
     1502E         1504D         1502F        1502G
be disposed of by lease on a royalty basis, with provisions requiring a
                              1502H
certain amount of development each year; and in order to prevent the use and cession of such lands with others of similar character so as to constitute a monopoly forbidden by law, the lease should contain
                                    1502I
suitable provision subjecting to forfeiture the interest of persons participating in such monopoly. It should be done by the Goverment's
                                                        1504E
Interior Department through the Geological Survey.

CONCEPT INDEXING AMONG DATABASE OF DOCUMENTS USING MACHINE LEARNING TECHNIQUES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/746,671 entitled "Concept Indexing Among Database of Documents Using Machine Learning Techniques" filed Jun. 22, 2015, which claims benefit of U.S. Provisional Patent Application Ser. No. 62/095,445 entitled "Concept Indexing Among Database of Documents Using Machine Learning Techniques" filed Dec. 22, 2014 and U.S. Provisional Patent Application Ser. No. 62/133,871 entitled "Concept Indexing Among Database of Documents Using Machine Learning Techniques" filed Mar. 16, 2015. Each of these applications are hereby incorporated by reference herein in their entireties.

BACKGROUND

In the area of computer-based platforms, documents may be searched based on keywords.

SUMMARY

The systems, methods, and devices described herein each have several aspects, no single one of which is solely responsible for its desirable attributes. Without limiting the scope of this disclosure, several non-limiting features will now be discussed briefly, which may be combined in various embodiments.

In some embodiments, a computing system for identifying concepts of interests to a user in specific segments of a plurality of documents each having one or more separate segments. The computing system may include one or more hardware computer processors configured to execute software instructions. The computing system may further include one or more storage devices storing software instructions configured for execution by the one or more hardware computer processors. When executed, the software instructions may cause the computing system to identify a plurality of segments within the plurality of documents, wherein at least some of the plurality of documents each include two or more segments, wherein identifying segments includes analyzing the plurality of documents for features indicative of possible section headings, including at least one of: casing, spacing, punctuation, common words, or groups of words. When further executed, the software instructions may cause the computing system to access a concept hierarchy including a plurality of concepts of interest to the user, the concept hierarchy further including concept keywords associated with respective concepts. When further executed, the software instructions may cause the computing system to, for each concept, determine statistical likelihoods that respective identified segments are associated with the concept. The statistical likelihoods may each be based on at least one of, for each combination of a particular concept and a particular segment: a quantity of the particular concept keywords in the particular segment; a density of the particular concept keywords in the particular segment; or a distribution of the particular concept keywords within the particular segment. When further executed, the software instructions may cause the computing system to store in a concept indexing database the plurality of concepts and the statistical likelihoods that respective concepts are in each of the determined respective segments, wherein the concept indexing database is usable to identify, in response to a user query for a specific concept, a ranked listing of one or more segments having highest statistical likelihoods of being associated with the specific concept.

In some embodiments, a computing system for information retrieval comprises one or more hardware computer processors programmed, via software instructions. When executed, the software instructions may cause the computing system to access a plurality of documents, each document from the plurality of documents associated with one or more words. When further executed, the software instructions may cause the computing system to identify, from the plurality of documents, a plurality of segments, wherein each segment of the plurality of segments is identified based at least on analyzing one or more features of each document from the plurality of documents, the one or more features comprising at least one of casing, spacing, punctuation, or common words, and wherein each segment of the plurality of segments is at least associated with a portion of a respective document. When further executed, the software instructions may cause the computing system to access a plurality of concepts of interest for identification within the plurality of segments. When further executed, the software instructions may cause the computing system to access a mapping from respective ones of the plurality of concepts to respective keywords from an initial keyword set. When further executed, the software instructions may cause the computing system to determine a first set of segments from the plurality of segments based at least on the initial keyword set, respective ones from the initial keyword set corresponding to respective words from the first set of segments. When further executed, the software instructions may cause the computing system to determine a related keyword set based at least on identifying respective words from the first set of segments that were not present in the initial set of keywords. When further executed, the software instructions may cause the computing system to update the mapping to include associations between respective ones of the plurality of concepts and respective related keywords. When further executed, the software instructions may cause the computing system to determine a second set of segments from the plurality of segments based at least on the related keyword set, respective ones from the related keyword set corresponding to respective words from the second set of segments. When further executed, the software instructions may cause the computing system to index the plurality of concepts, wherein respective ones of the plurality of concepts are associated with at least one segment from the first set of segments or the second set of segments, wherein the association between respective ones of the plurality of concepts and the at least one segment is based at least on the mapping. When further executed, the software instructions may cause the computing system to store the index in a non-transitory computer storage.

In some embodiments, computer-implemented method for information retrieval comprises identifying a plurality of segments within a plurality of documents, wherein identifying segments includes analyzing the plurality of documents for features indicative of possible section headings, including at least one of: casing, spacing, punctuation, common words, or groups of words. The method may further comprise accessing a concept hierarchy including a plurality of concepts of interest to the user, the concept hierarchy further including concept keywords associated with respective concepts. The method may further comprise, for each concept, determining statistical likelihoods that respective identified segments are associated with the concept, the statistical likelihoods may each be based on at least one of, for each combination of a particular concept and a particular segment: a quantity of the particular concept keywords in the particular segment; or a distribution of the particular concept keywords within the particular segment. The method may further comprise generating an index from the plurality of concepts and the statistical likelihoods that respective concepts are in each of the determined respective segments. The method may further comprise storing the index in a non-transitory computer storage.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 3 illustrates an example document that may be processed by the concept indexing system, according to some embodiments of the present disclosure.

FIG. 4 illustrates another example document that may be processed by the concept indexing system, according to some embodiments of the present disclosure.

FIG. 15 illustrates another example document that may be processed and/or analyzed by the concept indexing system, according to some embodiments of the present disclosure.

DETAILED DESCRIPTION

Figure 1:
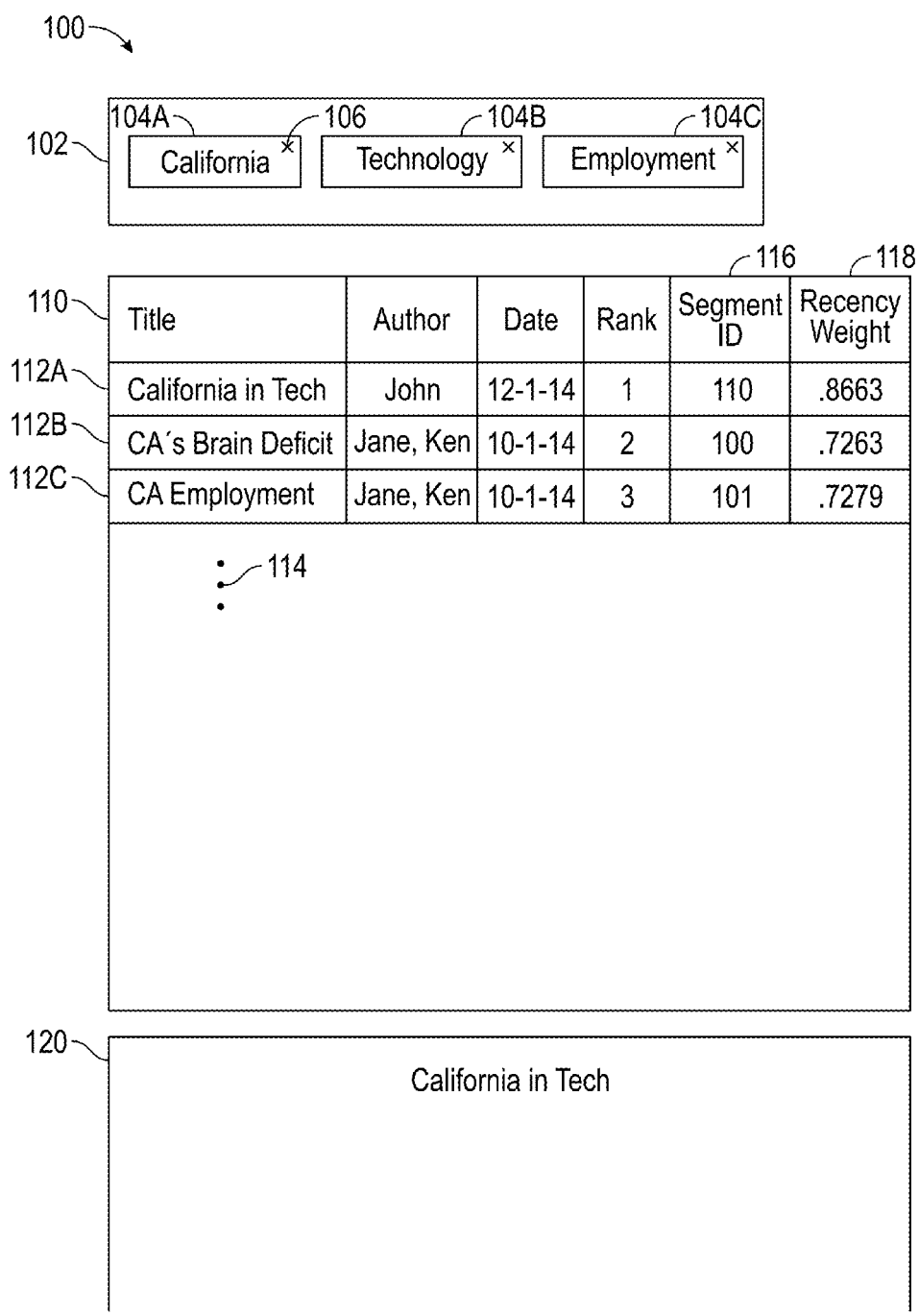
FIG. 1 illustrates an example user interface of the concept indexing system, according to some embodiments of the present disclosure.

Documents may be searchable with the goal of improving particular aspects of information retrieval. For example, in a computer-based context, documents may be searched based on words. A researcher that wants to learn more about a subject may submit a search query of search terms to an informational retrieval or database system. The system may return search results or documents that include the search terms to the user.

Researchers may be interested in querying a collection, library, and/or database of documents. For example, a graduate student at a research organization may be interested in learning more about one or more topics. In another example use case, a financial analyst at a bank and/or investment firm may be interested in querying a body of internal documents to develop new investment ideas and/or strategies. The researchers at these organizations and/or institutions may be interested in querying documents and/or portions of documents based on higher-level categories and/or concepts in place of and/or in addition to standard keyword searching and/or information retrieval techniques. It will be appreciated that the systems and methods described herein may be used in any number of settings, such as any area pertaining to information retrieval and/or research, e.g., online search, search engines, and/or library retrieval systems.

In addition to traditional keyword based searching, disclosed herein are systems and methods for analyzing, indexing, and/or querying documents, a library of documents, portions of documents, and/or a database. Using the techniques and systems disclosed herein, sections and/or segments of interest to a user may be determined from one or more documents. The segments and/or documents may be indexed by concept and/or higher-level category of interest to a user. The segments and/or documents may be further analyzed to rank the segments and/or documents by a statistical accuracy and/or likelihood of relatedness to one or more particular concepts and/or higher-level categories. Thus, the concept indexing system disclosed herein may distinguish between segments of a document that include a keyword of interest, but are primarily focused on another topic that only peripherally is associated with the keyword, from other segments that are primarily focused on the keyword of interest. Furthermore, segments and/or documents may be ranked based on recency decay functions that distinguish between basic and temporal segments and/or documents. In other words, the concept indexing system may distinguish between segments that relatively maintain their relevance over time in contrast with temporal segments whose relevance decays more rapidly over time.

In some embodiments, a concept indexing system may process and/or access a library of documents and/or articles. Documents may be compound, such as including multiple sections and/or segments, which may be indicated by headings, spacing, punctuation, styling, and/or other features. A user may be interested in specific segments of a document, and, therefore, it may be advantageous for the concept indexing system to allow the retrieval of specific segments. Another advantage of segregating a document into discrete segments under sections is that the concept indexing system may provide enhanced and/or refined searching. For example, if a researcher is interested in agriculture in Norway, then the user may search for both topics and/or concepts "Norway" and "Agriculture." In the same example, a specific document, Document A, may include a section about current politics in Norway and another section about agriculture in France. In some embodiments, the concept indexing system may not provide a search result for Document A in response to the search "Norway" and "Agriculture" because the system is configured to query the database by segment instead of document, for example. There may be no search result for the document because the document does not include a segment and/or section that discusses both Norway and agriculture and/or the database of segments and/or documents is indexed based on that level of granularity in mind. Another aspect of concept indexing is that segments and/or documents may be categorized by type. For example, segments may be either temporal or more basic and/or fundamental in nature. For example, a segment may be associated with a monthly update about current events. In the same document as the temporal segment, another portion of the document may be associated with more basic and/or fundamental principles about science, math, politics, and/or the economy. For example, the beginning section of the document may outline the fundamental principles that the article is based on. Thus, it may be advantageous for the concept indexing system to differentiate and/or rank segments based on the type of segment.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A "document" refers to any collection of words and/or text. Non-limiting examples of documents include electronic documents, word processing documents, spreadsheets, text files, a Portable Document Format ("PDF"), news articles, headlines, image data, physical, tangible, and/or paper documents, and any other type of content that may be associated with any type of textual content.

A "segment" refers to any portion of one or more documents. For example, a segment may include a section and/or portion of a document as indicated by headlines, paragraphs and/or some other formatting. A document may include multiple segments and/or a segment may include more than two portions of separate documents.

A "concept" may refer to a label, category, word, groups of words, and/or tag that references to an idea, notion, or category of information beyond just a keyword associated with such idea, notion, or category. A concept may be defined based on keywords, as well as other attributes discussed herein. A concept may be associated with a document, a portion of a document, and/or segment. For example, a segment may be associated with the concept "Agricultural Equipment" based on the text and/or meaning of the segment, even though the text "Agricultural Equipment" does not directly appear in the segment. In some embodiments, a document and/or segment may be associated with one or more concepts.

It will be appreciated that while the below examples refer to documents in English the systems and methods described herein may support other languages and/or character sets than English.

Example Query Interface

Figure 2:
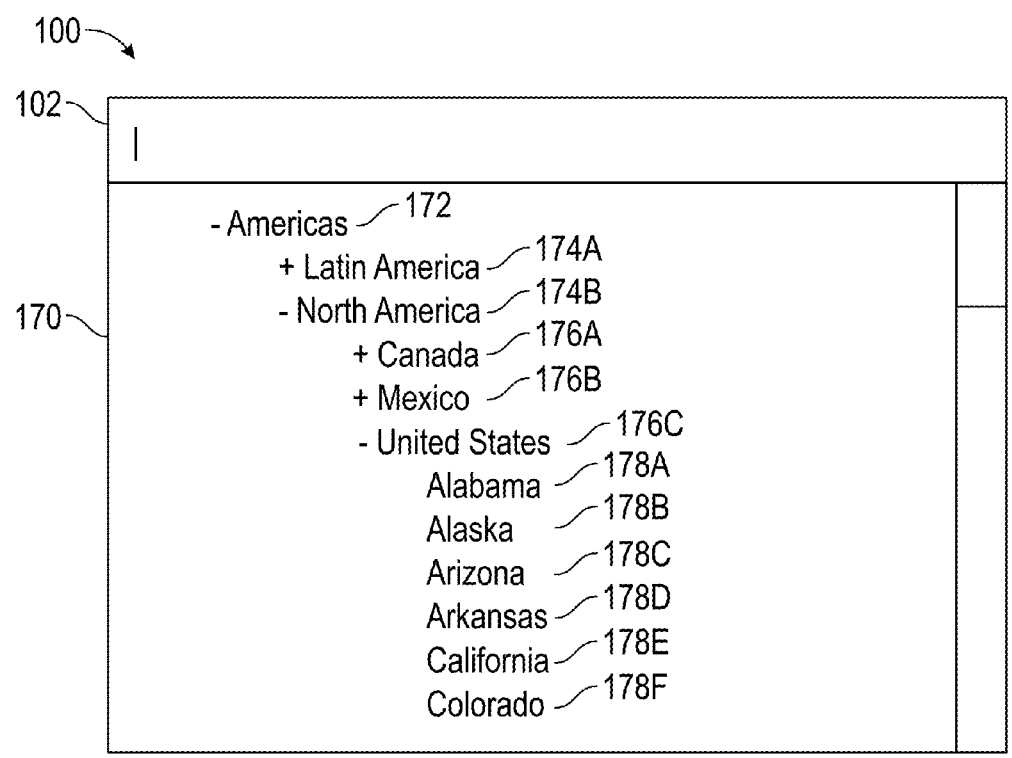
FIG. 2 illustrates another example user interface of the concept indexing system and/or a concept hierarchy, according to some embodiments of the present disclosure.

FIGS. 1 and 2 illustrate example user interfaces of the concept indexing and/or querying system, according to some embodiments of the present disclosure. In some embodiments, the user interfaces described below may be displayed in any suitable computer system and/or application, for example, in a web browser window and/or a standalone software application, among others. Additionally, the functionality and/or user interfaces of the system as shown in FIGS. 1 and/or 2 may be implemented in one or more computer processors and/or computing devices, as is described with reference to FIG. 19. Furthermore, FIG. 2 may illustrate a collection of concepts and/or hierarchy of concepts, which may not be displayed in such a user interface.

Referring to FIG. 1, the example user interface 100 includes input area 102, results area 110, and/or a segment area 120. In operation, a researcher may view segments indexed by one or more concepts and/or the concepts may be queryable through user interface 100. In this example, the concepts 104A-C are each associated with segments 112A-C shown in the results area 110. Ellipsis 114 may illustrate that more segments are presented in results area 110 other than what is illustrated.

Referring to FIG. 2, example user interface 100 illustrates a concept selection area 170. As illustrated, upon selecting of input area 102 by a user, concept selection area 170 may be presented to the user interface 100. Concept selection area may include concepts and/or a hierarchy of concepts. For example, the hierarchy of concepts may include a top node 172, "Americas," with sub-nodes 174A-B, "Latin America," "North America," respectively, and/or sub-sub-nodes 176A-C, etc. In some embodiments, each node within the concept hierarchy and/or tree may correspond to a concept, which may be selectable. In yet other embodiments, only the leaf nodes of the concept hierarchy may correspond to concepts that may be selected in user interface 100. The concepts selected within concept selection area 170 may be used to populate input area 102. For example, a selection of concept 178E may correspond to the selected concept 104A of FIG. 1. It will be appreciated that, in some embodiments, the presented concepts in user interface 100 may correspond to a list of concepts and/or may not correspond to a hierarchy.

In some embodiments, partial input within input area 102 may cause the concept selection area 170 to update. For example, text input, such as "tech" may cause the concept hierarchy and/or concept selection area 170 to dynamically update, such as including part of the concept hierarchy and/or collection matching the string and/or text "tech," such as the concept "Technology."

In some embodiments, selection of a top and/or root node may select and/or include all children and/or sub-nodes. For example, a selection of node 172 may include the selection of and/or cause the concept indexing system to process children nodes of node 172. Thus, in some embodiments, user interface 100 may present segments associated with the selected node and/or the children nodes of the selected node.

Returning to FIG. 1, example user interface 100 illustrates an operation to query a collection and/or library of documents and/or segments. For example, the database of documents and/or segments may be queried by user through input area 102 based on the selected concepts 104A-C, "California," "Technology," "Employment," respectively. In some embodiments, in response to selection of a concept, such as concept 104A, results area 110 may update dynamically. The database and/or system may be queried for segments and/or one or more result sets based on concepts 104A-C. For example, segments relating to each of the concepts and/or categories 104A-C are presented to the user. For example, the first result 112A, "California in Tech," is associated with all of the concepts 104A-C, such as California, technology, and employment. The segment corresponding to the entry 112A, titled "California in Tech," may be a section of an article describing employment opportunities in the technology area in California.

In some embodiments, results area 110 may present information resulting from a search query of the database. For example, results area 110 may include a table of search results columns. As illustrated, the columns may be associated with the title, one or more authors, a publication date, a rank, a segment identifier, a recency weight, and/or any other information and/or metadata associated with the segment and/or search result. In some embodiments, each column may be sorted in ascending/descending alphabetical, numerical, and/or any other order, which may be selected by a user using existing user interface and/or sorting functionalities. In some embodiments, each column may be filtered and/or searched by keyword, which may update the results area 110. For example, the results may be filtered by a particular author name and/or particular string in the title. It will be appreciated that some of the illustrative columns in results area 110 are optional and/or configurable. For example, columns 116 and 118, "segment ID" and "recency weight," respectively, may be configured to be shown to a system administrator for debugging purposes and/or may not be intended to be shown to an end user of the system, such as a researcher.

In some embodiments, results area 110 may present individual segments matching the search query. For example, segments 112B and 112C correspond to the same document. While the original document is titled "CA Employment," and that document may include dozens or more segments, the concept indexing system has analyzed and/or processed the document to determine that segments 112B-C, each with separate segment titles illustrated in the title column, each include discussion of "California," "Technology," and "Employment" concepts within those specific segments of the document.

As illustrated, in some embodiments, selection of a search result may cause a presentation and/or a preview of the associated segment in segment area 120. For example, a user may select entry and/or row 112A in user interface 102 to cause presentation of segment area 120. The segment and/or preview of a segment shown in segment area 120 may correspond to the entry and/or row 112A.

In some embodiments, it will be appreciated that the concept indexing and/or query system may support additional user interfaces. Additionally or alternatively, user interfaces of the concept indexing system may correspond to graphs, connected graphs, and/or other data visualizations of documents and/or segments not illustrated in FIG. 1 or 2.

FIGS. 3 and 4 illustrate example documents that may be processed by the concept indexing system. As illustrated in FIG. 3, document 300 may include multiple segments 310 and 320. Referring to FIG. 4, document 400 may include subsegments 402, 410A-B, and/or 420. It will be appreciated that while segments are shown on one page of a document, a segment may extend and/or span multiple pages of a document. Methods and techniques for segmenting and/or identifying segments within documents is discussed in further detail herein.

System Overview

Figure 5:
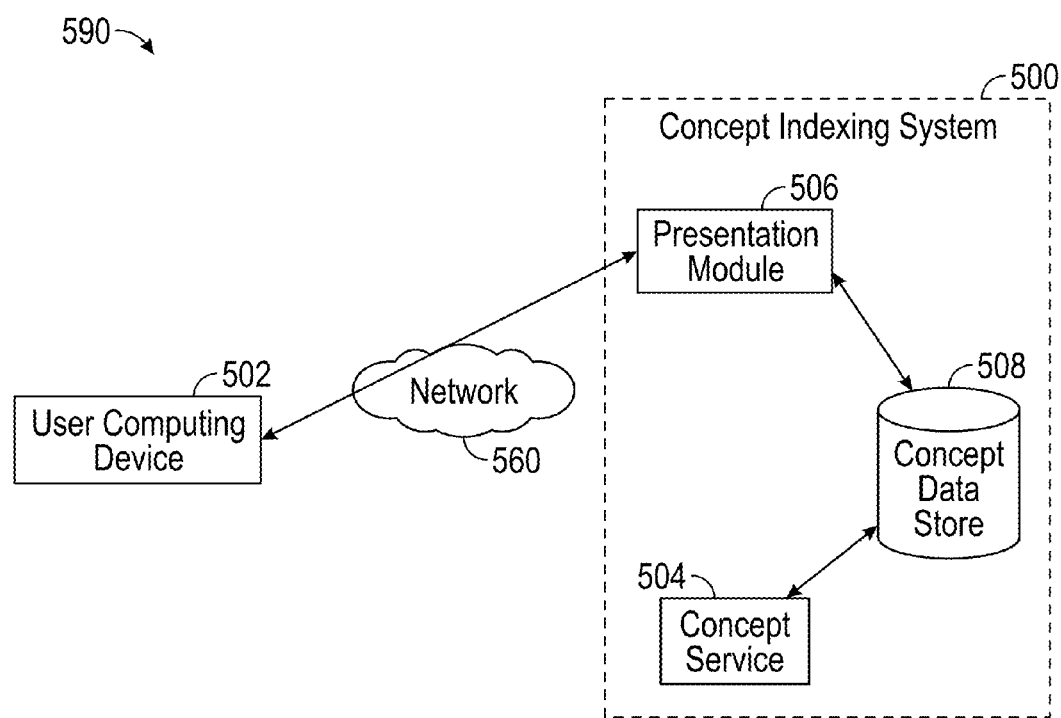
FIG. 5 is a block diagram illustrating an example concept indexing system, according to some embodiments of the present disclosure.

FIG. 5 illustrates a concept indexing system 500, according to some embodiments of the present disclosure. In the example embodiment of FIG. 5, the database environment 590 comprises a network 560, a concept indexing system 500, and a user computing device 502. Various communications between these devices are illustrated. For example, user computing device 502 may send requests and/or queries to concept indexing system 500. In this embodiment, concept indexing system 500 includes presentation module 506, concept service 504, and concept data store 508, each of which is described in further detail herein. The concept data store may store concept data in one or more databases, where "database" refers to a database (e.g., RDBMS or SQL database), an in-memory database, or may refer to any other data structure, such as, for example a hash map, hash set, JavaScript Object Notation (JSON), comma separated values (CSV), eXtendible markup language (XML), TeXT (TXT) file, flat file, spreadsheet file, and/or any other widely used or proprietary format.

In some embodiments, various communications and/or events within the database environment 590 may occur independently and/or in response to one another. For example, concept service and/or server 504 may process a collection and/or library of documents to index segment intersections of those documents by concept. The concept to segment indexes may be stored in the concept data store 508. User computing device 502 may be in communication with the presentation module 506. For example, presentation module may generate user interfaces, such as user interface 500 of FIGS. 1 and/or 2. In some embodiments, presentation module 506 may execute on a web and/or network server to present network pages and/or user interfaces to the user computing device 502. In response to queries originating from user computing device 502, presentation module 506 may query the indexes and/or data of concept data store 508. The results of the queries may be transmitted to user computing device 502 and/or presentation module 506.

Process Overview

Figure 6:
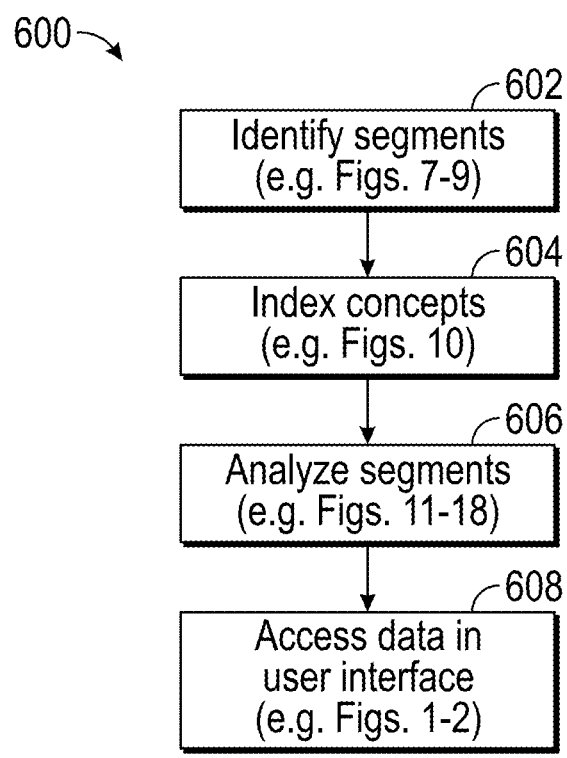
FIG. 6 is a flowchart illustrating an example concept indexing process overview, according to some embodiments of the present disclosure.

FIG. 6 is a flowchart illustrating an example concept indexing process overview 600, according to some embodiments of the present disclosure. The method of FIG. 6 may be performed by the concept indexing system 500 of FIG. 5, such as the various components of FIG. 5 that are discussed above, including concept service 504 and/or the presentation module 506. Depending on the embodiment, the method of FIG. 6 may include fewer or additional blocks and/or the blocks may be performed in order different than is illustrated.

Beginning at block 602, concept service 504 may identify segments intersections of one or more documents. Identifying segments of documents may include accessing the document, analyzing the features of the document, and/or merging related subsections of documents. In some embodiments, identifying segments of documents may be accomplished by machine learning algorithms and/or techniques, which will be described in further detail herein. Example processes and/or sub-processes of identifying segments are described in further detail with reference to FIGS. 7-9.

At block 604, concept service 504 indexes the segments identified at block 602 by concept. For example, concept service 504 may access a set of concepts and/or a concept hierarchy. In some embodiments, each individual concept from the set of concepts may be associated with an initial keyword set. Concept service 504 may then build an initial training set of segments that match words from the initial keyword set for each concept. The training set may be further developed by concept service 504 when other words not in the initial keyword set are identified from the identified segments matching the initial keyword set. As a result, concept service 504 may generate an index of concepts to segments. Similar to block 602, block 604 may be performed by concept service 504 using one or more machine learning algorithms and/or techniques. Furthermore, an example process of block 604 is described in further detail with reference to FIG. 10.

At block 606, concept service 504 further analyzes the segments to rank and/or score the segments. Ranking of a concept/segment combination may be based on the density and/or distribution of the concept within a segment. In other words, the ranking may be an "intrinsic" relationship of segment to a searchable concept. Furthermore, a researcher may be interested in two or more concepts. Typically, when a researcher is interested in and/or searches for two or more concepts and/or topics the researcher expects segments that relate equally to the two or more concepts. For example, if a researcher is researching employment in California, then the researcher may expect the article to be generally about both employment and California in equal amounts, as opposed to an article about employment that discusses employment in all fifty states. Thus, concept service 504 may be configured to generate statistical confidence weights and/or calculations indicating the segments that may be likely interest to the user when associated with two or more concepts. Example processes of concept ranking and/or intersection ranking are described in further detail with reference to FIGS. 11-15. In some embodiments, ranking of multiple searchable concepts may occur at query time (e.g., as described with reference to FIGS. 1 and/or 2) to combine segment weights for the multiple searchable concepts (e.g., as described with reference to FIG. 12).

Furthermore, segment analysis may constitute ranking of the segments based on one or more decay functions. In some cases, segments may be either temporal or more basic in nature. For example, a segment may be related to a particular month and/or time period, whereas a different segment may be more directed towards a fundamental principle and/or basic premise. An example of the former might be a historical account of a particular famine and an example of the latter may be an article regarding the common drivers or factors of macroeconomic growth. In some embodiments, concept service 504 may initially rank segments based on their publication dates and/or some other date (e.g., dates of publication of the article or document that includes the segment). Based on the number of temporal words in the segment, indicating that the segment is more temporal in nature, the recency ranking of the segment may be further adjusted. Other example processes and/or aspects of concept ranking, such as ranking based on recency decay, are described in further detail with reference to FIGS. 16-18.

At block 608, data, such as indices and/or segments, may be accessed by presentation module 506 for presentation in user interface 100. The access of concept and/or segment data by presentation module 506 for presentation in a user interface is described in further detail with reference to FIGS. 1, 2, 5, and/or 19.

Example Machine Learning Techniques

In some embodiments, segment identification, concept indexing, and/or other methods disclosed herein may be accomplished via one or more techniques and/or algorithms in artificial intelligence, machine learning, statistical and/or probabilistic machine learning, unsupervised learning, supervised learning, semi-supervised learning, and/or some combination thereof. For example, in supervised and/or semi-supervised learning contexts, a training set and/or training data may be used by concept service 504 to update respective machine learning algorithms. For example, a feature extractor may be used to extract features and/or attributes from each item of data. A user then categorizes the item of data and/or verifies the predicted categorization of the item of data, which is used by concept service 504 to update the machine learning algorithm based on the extracted features and the specified result. In some embodiments, the output of concept service 504 may be statistical likelihood of a predicted outcome based on the updated machine learning algorithm. Examples of machine learning algorithms that may be used with the systems and techniques described herein include decision trees and/or boosting. A decision tree may predict the value of a target variable based on several input variables and/or dimensions. Each interior node of a decision tree may correspond to one of the input variables. The edges of the decision tree may correspond to children for each of the possible values of that input variable. Each leaf may represent a value of the target variable given the values of the input variables represented by the path from the root to the leaf. A tree can be determined by splitting the source set into subsets based on an attribute value test. This process may be repeated by concept service 504 on each derived subset in a recursive manner, such as recursive partitioning. The recursion is completed when the subset at a node has all the same value of the target variable, or when splitting no longer adds value to the predictions. This process of top-down induction of decision trees may be an example greedy algorithm. As mentioned above, a machine learning algorithm may process a number of dimensions and/or features. However, the number of dimensions and/or features may become computationally intensive for processing purposes. Thus, a boosting algorithm may select those features which improve the predictive power and/or accuracy of the machine learning algorithm model, which may reduce the number of dimensions and/or features that may improve execution time as irrelevant features and/or dimensions are ignored. A boosting algorithm may be a method of training a boosted classifier. A boosting classifier may include a classifier in the form of:

$$F_T(x) = \sum_{t=1}^{T} f_t(x)$$

Where each $f_t$ is a weak learner that takes an object and/or data x as input and returns a result indicating the classification of the object and/or data. The sign of the weak learner output may identify y the predicted object and/or data class and the absolute value gives the statistical confidence in that classification. At each iteration of the training process, a weight may be assigned to each sample in the training set equal to the current error of that sample. These weights may be used to inform the training of the weak learner, for instance, decision trees can be grown that favor splitting sets of samples with high weights. Thus, decisions trees and/or boosting are non-limiting examples of machine learning algorithms that may be used by the concept indexing systems.

In some embodiments, concept indexing and/or segment analysis and/or ranking using the techniques described herein may be based on other metadata associated with a segment, such as author, publisher, research institution, etc. For example, the concept indexing system may extract author, publishers, and/or publication dates for segments and/or documents for additional processing. For example, a machine learning algorithm may be used to determine concepts that an author typically writes and/or publishes on. In some embodiments, the concept indexing system may support post-indexing filters that allow users to filter by author, publication date, publisher, etc. For example, filters that may be available in user interface 100.

Identifying Segments

Figure 7:
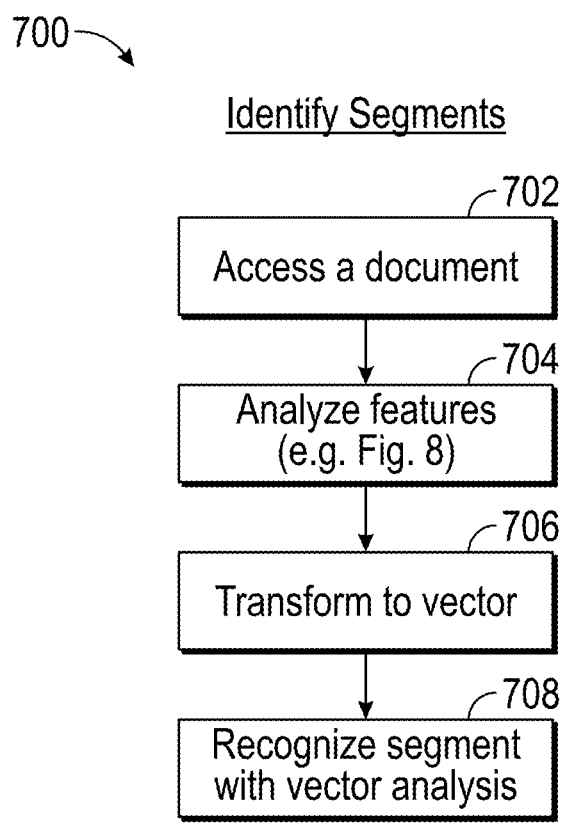
FIG. 7 is a flowchart illustrating an example segment identification process, according to some embodiments of the present disclosure.

FIG. 7 is a flowchart illustrating an example segment identification process 700, such as may be performed as part of the segment identification process 602 of FIG. 6, according to some embodiments of the present disclosure. The method of FIG. 7 may be performed by the concept indexing system 500 of FIG. 5, such as the various components of FIG. 5 that are discussed above, including concept service 504. Depending on the embodiment, the method of FIG. 7 may include fewer or additional blocks and/or the blocks may be performed in order different than is illustrated.

Beginning at block 702, concept service 504 accesses a document. As described herein, a document may include one or more segments. Example documents may include document 300 and/or document 400 of FIGS. 3 and/or 4, respectively. In some embodiments, documents may be stored in the concept data store 508 in various data formats. For example, text data associated with distinct documents may be stored in concept data store 508. Additionally or alternatively, native formats of documents may be stored in the constant data store 508 such as a PDF, a word processing document format, an image data format, or some other data format. Concept service 504 may process any native document formats to generate associated text data using one or more optical character recognition techniques.

At block 704, concept service 504 analyzes various features of the accessed document. For example, casing, spacing, punctuation, formatting, comment words and/or groups of words, and/or other features of the document may indicate segments. In some cases, documents have a formatting structure to organize the document. For example, portions and/or segments of the document may be segregated by headings, such as titles and/or subtitles. The headings may include specific casing formats, such as capitalizing of the first letter of words or capitalizing all letters of all words, and/or particular sizing and/or fonts of the headings. For example, headings may be larger in size and/or in a bold font. Punctuation may also indicate beginnings of new segments. For example, titles typically may not include period characters, however, a title and/or subtitle may include a question mark or semi-colon character. Various word processing techniques may be used to analyze the features of the text data and/or document. Examples of segment feature identification of a document is further described in detail with reference to FIG. 8.

At block 706, concept service 504 generates a vector and/or data structure based on the identified features from block 704. For example, a binary vector such as "[100110101010 . . . ]" may be generated from the identified features. In the previous vector example, at the first position of the vector a "1" may indicate that a portion of the document starts with capital letter and at the second position of the vector a "0" may indicate that the same portion of text does not end with a question mark or semi-colon character. The vector and/or data structure may be used by concept service 504 to generate a statistical likelihood indicating whether a segment is present, which is described below.

At block 708, concept service 504 processes the vector and/or data structure generated at block 706 to compute a statistical likelihood whether the one or more portions of the document correspond to one or more segments. For example, concept service 504 may use a machine learning algorithm to process the vector data. Concept service 504 may determine the segments based on the location of the titles and/or headings within the document. For example, as illustrated in document 300 of FIG. 3, segment 310 is between heading 312 and heading 314 and segment 320 is between heading 314 and another heading (not illustrated) or the end of the document. As described herein, concept service may use a decision tree, boosting algorithm, and/or some other machine learning algorithm to process the vector data and generate a statistical likelihood that a portion of a document is a segment. In some embodiments, the statistical likelihoods and/or indicators of segment identification may be stored in concept data store 508. In some embodiments, blocks 702, 704, 706, and/or 708 may execute iteratively to process a collection of documents. Additionally or alternatively, concept service 504 may iteratively execute some blocks of process 700 to process portions of a document to identify segments in an iterative manner. For example, process 700 may identify a first, second, and third segment of a document by iterative executions of some blocks of process 700.

In some embodiments, an optional step and/or block of process 700 may be training of the concept indexing system and/or machine learning algorithm. For example, as described above, a machine learning algorithm for providing statistical confidence levels for segment predictions may be based on a training set. Through supervised and/or semi-supervised machine learning, an operator may specify whether headings and/or segments of documents have been accurately identified. Thus, the machine learning algorithm for identifying segments may be trained as an optional step of process 700.

Figure 8:
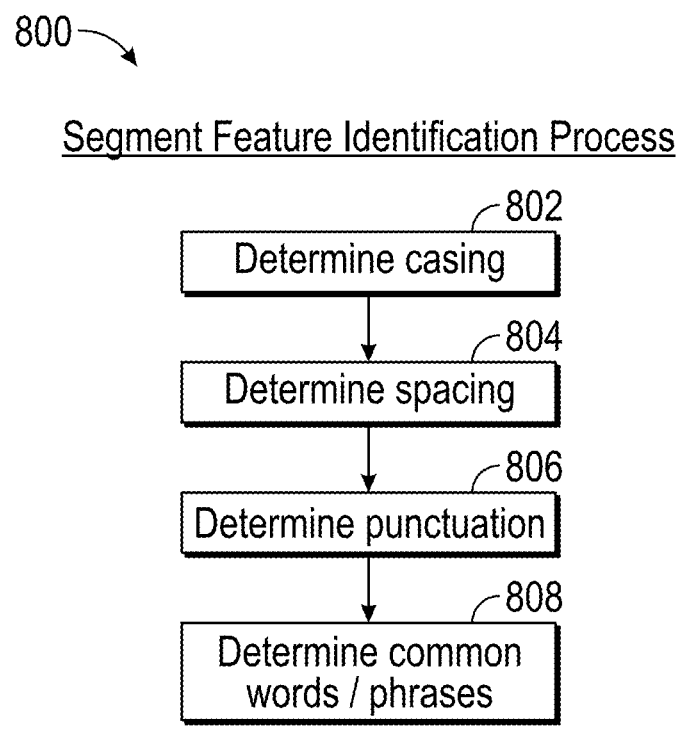
FIG. 8 is a flowchart illustrating an example segment feature identification process, according to some embodiments of the present disclosure.

FIG. 8 is a flowchart illustrating an example segment feature identification process 800, such as may be performed as part of the feature analysis process and/or block 704 of FIG. 7, according to some embodiments of the present disclosure. The method of FIG. 8 may be performed by the concept indexing system 500 of FIG. 5, such as the various components of FIG. 5 that are discussed above, including concept service 504. Depending on the embodiment, the method of FIG. 8 may include fewer or additional blocks and/or the blocks may be performed in order different than is illustrated. For example, other segment and/or heading features may be used to determine segments and/or headings additionally or alternatively to the features described below.

Beginning at block 802, concept service 504 may determine and/or analyze casing features of a document. As described herein, casing may refer to the capitalization of particular letters and text data to indicate whether the text is possibly associated with a heading and/or title. For example, text 312 of FIG. 3, "CA Employment," includes capitalization of letters that may be identified by concept service 504. Another casing feature includes capitalization of all of the letters text, such as, "CALIFORNIA EMPLOYMENT WEEKLY." In some embodiments, it will be appreciated that other font and/or letter sizing techniques may be used to recognize headings and/or titles. Depending on the embodiment, such casing determinations within a document may be compared to other portions of the document order to identify probable segment headings. For example, if a document includes four lines of text in all caps, separated by multiple paragraphs using sentence case, the concept service 504 may determine based on such casing information that the four lines of capitalized text could be segment headings.

At block 804, concept service 504 may determine and/or analyze spacing features of a document to determine headings and/or segments. For example, as illustrated in FIG. 3, document 300 includes line spacing 316 and line spacing 318. In this example, line spacing 316 is larger than the line spacing 318. For example, the line spacing between a heading may be two lines, whereas the line spacing between paragraph text may be single spaced and/or different than the heading line spacing. Thus, the concept service 504 may use the increased spacing 316 as another attribute indicative of a possible segment heading.

Other document and/or segment features that may be analyzed include the centering of headings. For example, the centered spacing of heading 314 might be determined by concept service analyzing the white space and/or indentation 330 and/or some other text and/or document features of document 300. Thus, identification of centered text, especially when text below and/or above the centered text is not centered (e.g. paragraph text that is left aligned or justified), provides concept service 504 another attribute usable to identify possible segment headings.

At block 806, concept service 504 may determine and/or analyze punctuation features of a document to determine headings and/or segments. For example, as described herein, unlike text of a paragraph, the text of the heading may not end in a period character. However, a heading may end in one or more specific punctuation and/or special characters, such as a question mark or a semi-colon character. Thus, concept service 504 may analyze various punctuation and/or character features that are factors that contribute to a statistical likelihood of the presence of headings and/or segments of a document.

At block 808, concept service 504 may determine and/or analyze common words, phrases, and/or groups of words to determine headings and/or segments of the document. Some documents may begin with introductory phrases and/or words for headings. Example introductory words and/or phrases include, "Situation in," "Update on," "Summary," "Conclusion," or some other word and/or groups of words that are typically used in document headings. In some embodiments, introductory phrases and/or words may be user generated, determined by machine learning, and/or some combination thereof, such as determining introductory words based on a training set. Thus, concept service 504 may analyze common words and/or groups of words to generate a statistical likelihood for the presence of headings and/or segments.

In some embodiments, it will be appreciated that some combination of blocks 802-808 may be executed to determine a statistical likelihood regarding the presence of a heading and/or segment in a document. For example, some combination of blocks 802-808 may be executed by process 700 of FIG. 7, such as block 704 to analyze one or more features and/or attributes of a document. Thus, concept service 504 may use some combination of document features, such as, casing, spacing, punctuation, formatting, common words, grouping of words, and/or phrases to generate a likelihood that various portions of documents are segments. For example, the various features are transformed to one or more vectors at block 706 of FIG. 7 and may be processed by a machine learning algorithm at block 708 to generate a statistical likelihood of the presence of headings and/or segments in a document.

Figure 9:
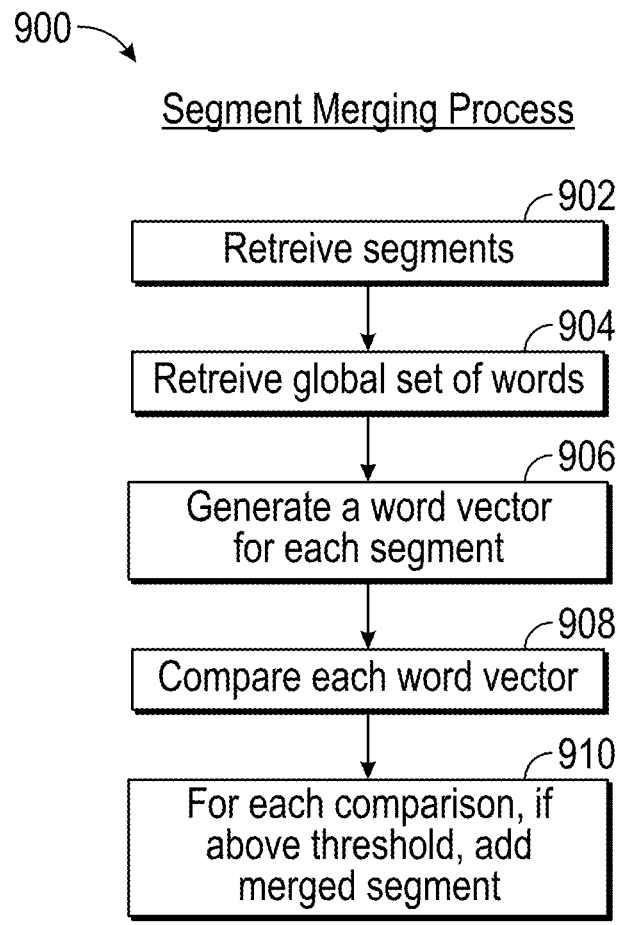
FIG. 9 is a flowchart illustrating an example segment merging process, according to some embodiments of the present disclosure.

FIG. 9 is a flowchart illustrating an example segment merging process 900, according to some embodiments of the present disclosure. In some cases, the segmentation processes 700 and/or 800 may be overly aggressive and/or incorrectly identify too granular of sections. For example, as illustrated in FIG. 4, document 400 may include subsections 410A and 410B. In the example, concept service 504 may initially identify each subsection 410A and 410B as two discrete segments. Thus, concept service 504 implementing process 900 may determine that subsections 410A-B should be merged together into one segment. In other words, process 900 may merge back sections and/or segments that were too aggressively split (e.g. minor sections and/or segments that belong together) using the vector similarity of the separated sections and/or segments, for example. The method of FIG. 9 may be performed by the concept indexing system 500 of FIG. 5, such as the various components of FIG. 5 that are discussed above, including concept service 504. Depending on the embodiment, the method of FIG. 9 may include fewer or additional blocks and/or the blocks may be performed in order different than is illustrated.

Beginning at block 902, concept service 504 retrieves and/or accesses segments from concept data store 508. Concept service 504 may access two or more segments to determine whether the segments should be merged. For example, concept service 504 may access and retrieve every segment, a particular set of segments, the segments for a particular document, and/or some combination thereof from concept data store 508. In one embodiment, the segments analyzed for possible merging include only segments that are adjacent one another within a single document.

At block 904, concept service 504 retrieves and/or accesses a global set of words from concept data store 508. For example, a global set of words may comprise a collection and/or data structure of each word from the library or a collection of documents. A global set of words may be determined based on one or more processes described herein, such as process 600 that may process every document in the library and/or collection, which may include the scanning of every document. For example, a global set of words may include a vector and/or data structures such as "['a,' 'about,' 'achievements,' 'adjacent,' 'after,' 'alive,' 'already,' 'America,' 'and,' 'announcing,' . . . ]." In some embodiments, a global set of words may correspond to generally common words, such as a set of common words available from a third-party library.

At block 906, concept service 504 may generate a word vector for the segments retrieved at block 902. For example, the global set of words, accessed at block 904, may be used to generate a word vector indicating the presence and/or count of words in the text of the segment. Using the example global word vector from above, Segment A may correspond to word Vector A: "[10, 2, 1, 0, 0, 0, 0, 0, 2, 2, 0, . . . ]" and Segment B may correspond to word Vector B: "[9, 1, 0, 0, 0, 0, 0, 0, 4, 2, 0, . . . ]." Thus, word vectors A and B may indicate the number of times a word from the global word vector is present in the text corresponding to segments A and B, respectively.

At block 908, concept service 504 compares the word vectors from block 906. For example, one comparison method that may be used by concept service 504 to determine the similarity of segments may be to use a cosine distance formula and/or a cosine similarity. Cosine distance and/or similarity may be a measure of similarity between two vectors of an inner product space that may measure the cosine of the angle between them. The cosine of 0° is 1, and it is less than 1 for any other angle. This may be determination of orientation: two vectors with the same orientation may have a cosine similarity of 1, two vectors at 90° may have a similarity of 0, and/or two vectors diametrically opposed may have a similarity of −1, independent of their magnitude. Cosine distance and/or similarity may be used in positive space, where the outcome is neatly bounded in [0, 1]. Cosine of two vectors may be determined by using the Euclidean dot product formula:

$$A \cdot B = \|A\| \|B\| \cos \theta$$

Thus, in the example with vectors A and B, the cosine of the angle between them may be about 0.922, which may indicate similarity between the two segments A and B. For example, segments A and B may both be about the topic of "America" and/or include a similar number of the occurrences of the word "America." It will be appreciated that process 900 may use other methods for calculating the similarity between two word vectors and/or may use another process for determining similarity between segments without the use of vectors.

At block 910, concept service 504 determines which segments to merge based on the comparison between the two or more segments. For example, for each comparison, if the comparison is above a threshold, concept service 504 may determine that two or more segments should be merged. For example, a cosine similarity between two word vectors above 0.8 may indicate that those segments should be merged.

In some embodiments, concept service 504 may optionally store and/or index the pre- and post-merged segments. For example, where segments A and B are merged by concept service 504 into segment AB, concept service 504 may store and/or index segments A, B, and/or AB (individually) in concept data store 508. In some embodiments, it may be advantageous to store the various pre- and post-merged segments individually for improved recall.

In some embodiments, process 900 may be used by concept service 504 to merge segments from more than one document. For example, where an original document is separated into two volumes and/or parts, such as a part one and part two, concept service 504 may use the process 900 to identify segments meeting the threshold similarity measure and merge those segments from multiple documents, such as two separate PDF documents. It will also be appreciated that, in some embodiments concept service 504 may iteratively apply the blocks of process 900 to iteratively merge segments. For example, concept service 504 may merge segments A and B into a new segment AB, and concept service may further merge segment AB and segment C into a new segment ABC using the merging process 900.

Concept Indexing

Figure 10:
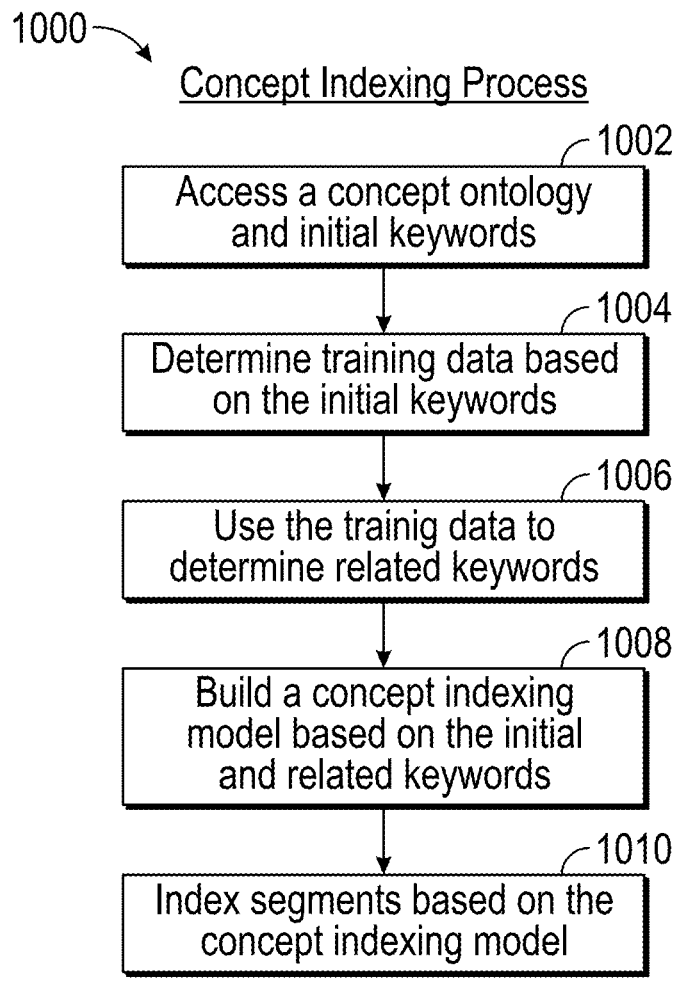
FIG. 10 is a flowchart illustrating an example concept indexing process, according to some embodiments of the present disclosure.

FIG. 10 is a flowchart illustrating an example concept indexing process 1000, such as may be performed as part of the concept indexing block 604 of FIG. 6, according to some embodiments of the present disclosure. In some embodiments, additionally or alternatively to keyword searching, it may be advantageous for research organizations and/or researchers to maintain a higher level ontology, concept hierarchy and/or high-level categories associated with their research articles, documents, and/or segments. For example, a researcher may use the concept ontology and/or hierarchy to query and/or navigate the document and/or segment library/database as described herein. In some embodiments, an index and/or mapping from higher-level concepts to individual segments may be determined based on initial keywords and/or grounded weights, as described below. The method of FIG. 10 may be performed by the concept indexing system 500 of FIG. 5, such as the various components of FIG. 5 that are discussed above, including concept service 504. Depending on the embodiment, the method of FIG. 10 may include fewer or additional blocks and/or the blocks may be performed in order different than is illustrated.

Beginning at block 1002, concept service 504 accesses a concept ontology and/or hierarchy that is associated with initial keywords. In some embodiments, an initial keyword mapping from particular words to the concept may be used to create a "dictionary" of a concept based on a set of related words, which is described in further detail below. For example, a concept, "Agricultural Equipment," may be associated with the keywords, "tractor," "plow," "rotator," "roller," "seed drill," etc. In some embodiments, the concept ontology, concept hierarchy, and/or mapping of concepts to initial keywords, may be user generated and/or provided by a user and/or research manager.

At block 1004, concept service 504 determines training data based on the initial keywords and/or keyword mapping. For example, concept service 504 may identify segments that include words from the one or more initial keyword sets. In the agricultural equipment example, the initial training data may include those segments that include text data and/or keywords such as "tractor," "plow," "rotator," "roller," "seed drill," etc. Thus, concept service 504 determines an initial training set of segments and/or data that may be used by the machine learning algorithm to determine segments associated with the concept.

At block 1006, concept service 504 uses the training data to determine related keywords and/or related keyword mappings. For example, concept service 504, using one or more machine learning techniques, may identify related keywords and/or mappings from the initial keywords. An example of related keyword identification through machine learning may be determining the words most uniquely correlated with the ones used in the initial keyword to concept mapping. For example, through applying the machine learning algorithm, concept service 504 may determine related keywords such as "fertilizer spreader," "broadcast seeder," or other related words to the concept of agricultural equipment, but which were not originally specified in the initial keywords set. In other words, the initially identified segments associated with the initial keywords may be used as positive examples of concept terminology by the machine learning algorithm.

At block 1008, concept service 504 may create a concept indexing model and/or machine learning algorithm based on the initial keywords set and the determined related keywords. For example, concept service 504 may include a superset of keywords that includes the initial keyword and the determined related keyword set for the respective concept. Therefore, concept service 504 may be configured to determine segments associated with a concept based on the concept indexing model. Furthermore, the concept indexing model that includes the related keywords may identify segments that were not originally identified based on the initial keywords set. In some embodiments, the concept indexing model and/or algorithm may output a statistical likelihood, probability of correctness, and/or confidence level that a segment may be associated with a respective concept. In some embodiments, the statistical likelihoods of concept to segment associations may be presented to the user, such as by the presentation module 506 in user interface 100. In some embodiments, blocks 1006 and 1008 may be repeated iteratively as additional segments are associated with concepts, such as to identify additional related keywords to correlate with particular concepts and then rebuilding or updating the model for that concept to potentially identify other related segments that may not have been identified using the previous version of the model. In this way, the concept identification process improves over time as additional segments are associated with particular concepts.

At block 1010, concept service may index segments based on the determined concept indexing model. For example, the segments identified by processes 700 and/or 900, which are stored in the concept data store 508, may be processed by concept service 504 to generate an index and/or mapping from individual concepts to correlating segments within the document library. In some embodiments, a concept to segment index may be stored in the concept data store 508 in various data formats. For example, concept to segment index may include a database index, a hash map, a hash set, an in-memory data object, some combination thereof, and/or any other data and/or data structure that can store a mapping from a concept to a segment. Additionally or alternatively, concept service 504 may store a concept to segment index for the concept to segment mappings that are above a statistical threshold and/or percentage as determined by the concept indexing model and/or algorithm. In some embodiments, the concept to segment index may store the statistical likelihood of concept to segment mappings as determined by the concept indexing algorithm. Thus, concept to segment index may include a list of concepts and, for each of the concepts, identifiers of zero or more segments that have a threshold likelihood of relating to that particular concept, where in some embodiments certain segments are not included in the listing if their corresponding likelihoods are below a predetermined threshold. The likelihood indicators are usable, as discussed herein, to sort and/or filter display of segments matching a particular concept (or concept) to provide the optimal quantity and relevance of results to a given user.

In some embodiments, concept service 504 may iteratively improve the accuracy of the concept indexing model and/or algorithm based on user feedback. For example, a user may interact with the concept indexing system to specify whether the concept to segment determination was accurate. For example, the weights of keyword vectors to concepts and/or weightings of particular words to a concept may be reviewed by a user for accuracy. Thus, concept service 504 may use supervised and/or semi-supervised techniques to improve the accuracy of the concept indexing model and/or algorithm.

Segment Analysis and/or Ranking

In some embodiments, the concept to segment indexes may be further analyzed and/or processed to enhance the user querying experience. For example, segments that are associated with a concept may be further ranked and/or ordered to provide the most likely segments and/or relevant items of interest to the user. The processes discussed below with reference to FIGS. 11-18 may be performed as part of the segment analysis process 606 of FIG. 6. Additionally, in certain embodiments one or more of the processes of FIGS. 11-18 may be used as part of the concept indexing process 604 of FIG. 6. For example, density of keywords in a segment, concept intersection information, and/or segment recency information may be used to associate concepts with segments. In some embodiments, these processes may be used to adjust particular concept to segment relevancy scores in order to better indicate relevance of a particular segment to a given concept that may have been originally determined without such additional analyses.

Figure 11:
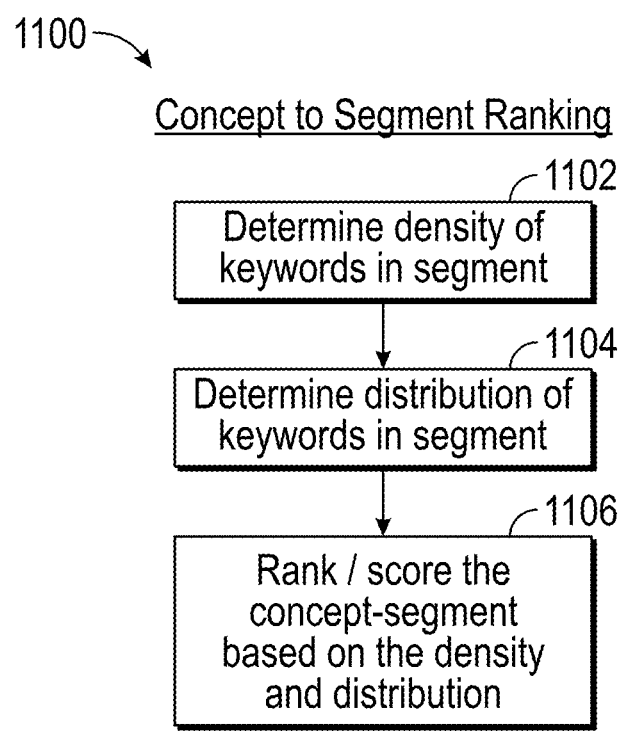
FIG. 11 is a flowchart illustrating an example concept to segment ranking process, according to some embodiments of the present disclosure.

FIG. 11 is a flowchart illustrating an example concept to segment ranking process 1100, according to some embodiments of the present disclosure. In certain embodiments, it may be useful and/or advantageous to display the segments that are most related to the concept user. In some embodiments, the "aboutness" and/or relevance of a concept to a segment may be determined based on the density of concept keywords in a segment. In some embodiments, the concept indexing system may use the respective term and/or relevant keyword distribution within a segment to gauge the "aboutness" of the segment with respect to a particular concept. For example, a segment about tractors might have a dense subparagraph about Idaho, while another document may reference Idaho even throughout the segment may be more "about" Idaho. In some embodiments, the "aboutness" of a segment may be measured by looking at a ratio of the median gap between consecutive mentions of the term in question (e.g. Idaho) divided by the longest span in the document without any mention of the term. Larger ratios may be more indicative of a more even distribution of the term throughout the document, or more "aboutness." Other methods for determining the "aboutness" of a concept to a segment include breaking the segment into portions and determining the number of times the relevant one or more terms appear in the portions. For example, a segment may be separated into portions of ten words and the segment may be analyzed for the number of times a particular terms are present within the portions and/or the number of portions with the particular terms. The method of FIG. 11 may be performed by the concept indexing system 500 of FIG. 5, such as the various components of FIG. 5 that are discussed above, including concept service 504 and/or presentation module 506. Depending on the embodiment, the method of FIG. 11 may include fewer or additional blocks and/or the blocks may be performed in order different than is illustrated.

Beginning at block 1102, concept service 504 may determine the density of keywords associated with the concept in a segment. In some embodiments, the density of relevant keywords may refer and/or be calculated with the following equation:

$$\frac{\text{\# of relevant keywords}}{\text{segment length}}$$

In addition to its plain and ordinary, segment length may refer to the number of words in a segment and/or the number of characters in a segment, for example. An example density of a segment Y with 100 keywords associated with agricultural equipment and a word count of 1000 may have a density of 0.1. If segment Z had a density of 0.05, then concept service 504 and/or presentation module 506 may determine a ranking that segment Y is more "about" the concept of agricultural equipment than segment Z. Determining the density of keywords may be advantageous as compared to other information retrieval techniques. For example, an information retrieval system based on keyword searching would return results that have at least one occurrence of a keyword, which effectively normalizes the results with respect to the density of the keywords.

At block 1104, concept service 504 may determine the distribution of keywords in a segment. For example, concept service 504 may use how the occurrences are distributed within a segment to rank and/or score the relevance and/or aboutness of a concept relative to a segment. As illustrated in FIG. 3, the relevant keywords 350A-I of segment 320 may be associated with the concept of religion. As illustrated in FIG. 4, the relevant keywords 450A-I of segment 420 may also be associated with the concept of religion. (It will be appreciated that the text of documents 300 and 400 may not be associated with the document headings simply for example purposes.) Furthermore, the number of relevant keywords 350A-I and keywords 450A-I (e.g., keywords associated with one or more concepts provided by a user) may be the same, such as nine keywords. However, the distribution of keywords 350A-I and 450A-I may be different. For example, the distance and/or gaps between keywords in segment 320 may be smaller than the distance and/or gaps between keywords in segment 420. In other words, segment 320 may have a higher concentration of related keywords, which may indicate that the segment is less about the concept religion than the segment 420 where the relevant keywords are more dispersed throughout the segment. Segment 420 may be considered more "pure" because it generally discusses the concept throughout the segment.

Another example of a segment that has a high density of keywords may be a segment that generally is about Ohio but which has a portion of the segment that specifically discusses agricultural equipment. Thus, concept service would determine the distribution of keywords to indicate that the segment is generally more about Ohio with a small focus on agricultural equipment.

Concept service 504 may use one or more formulas to calculate and/or determine the distribution of keywords in a segment. For example, concept service may use one or more metrics to determine the distribution of keywords. An example metric is the median gaps between keywords. In addition to its plain and ordinary meaning, a gap may refer to the number of words and/or characters between two words. For example, the median gap between the keywords of segment 320 may be relatively small because the keywords are located relatively close together in contrast with the relatively large median gap of keywords of segment 420. Another metric that may be used is maximum gap, which may refer to the greatest distance between keywords. For example, in segment 320 the maximum gap would be the number of words and/or characters between the keyword 350H, "France," and the keyword 350I, "God," at the bottom of the segment. An example ratio, and/or formula that may be further used by concept service 504 to determine distributions of keywords is:

$$\frac{\text{Maximun Gap}}{\text{Median Gap}}$$

Thus, the maximum/median gap ratio would be higher for segment 320 than for segment 420, which may indicate that segment 320 is relatively less about the concept than segment 420. In some embodiments, the maximum/median gap ratio may be used by multiplying the ratio times the density of the concept in the segment to determine the weight of the concept in the segment.

At block 1106, concept service 504 and/or presentation module 506 ranks and/or scores concept to segment mappings based on the density and/or distribution of related keywords. For example, segments with higher density related keywords and/or segments with greater distributions of related keywords may be more about the concept. In some embodiments, rankings of concepts to segments may be pre-computed and/or cached by concept service 504 for later access and/or retrieval. Additionally or alternatively, ranking and/or scoring of concepts to segments may be determined in real-time or near-time based on queries from an end user in user interface 100. For example, presentation module 506 may dynamically calculate rankings and/or scoring, such as rankings and/or scoring that reflect the "aboutness" of a concept to a segment based on blocks 1102 and/or 1104 in response to a user query. For example, as illustrated in FIG. 1, presentation module 506 may present the rankings of segments and/or present segment search results to a user in an order based on the determined ranking.

Figure 12:
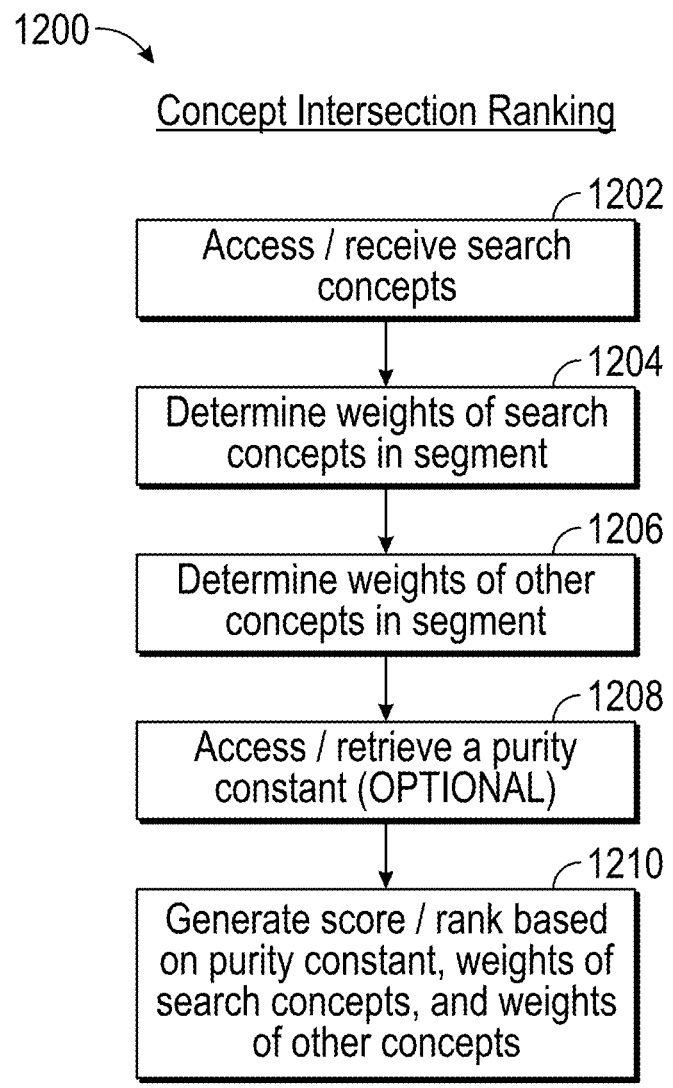
FIG. 12 is a flowchart illustrating an example concept intersection ranking process, according to some embodiments of the present disclosure.

FIG. 12 is a flowchart illustrating an example concept intersection ranking process 1200, according to some embodiments of the present disclosure. For example, as illustrated in user interface 100 of FIG. 1, two or more concepts may be selected in a search query. Thus, the concept indexing system may determine rankings for the segments as they are applicable to the combination of the two or more concepts. In some embodiments, in a concept driven search system, such as the concept indexing system, where a user selects two or more concepts for a search of the segment database, a user may be interested in segments that discuss the concepts in equal weight. In other words, when users search for multiple concepts, such as two concepts, users may be more interested in concepts that are about both concepts than unequally discussing one topic over another. For example, a segment that has one occurrence of the concept "Idaho" and seven of the concept "Agriculture" may be a less desired result than another segment that has four occurrences of "Idaho" and four occurrences of "Agriculture," which is a more balanced segment, and, therefore, may be of greater interest to the user. Additionally, a four paragraph segment that includes a first two paragraphs having twenty occurrences of keywords associate with the concept "Idaho" and only two occurrences of keywords associated with the concept "Agriculture," while the last two paragraphs having only two occurrences of keywords associated with the concept "Idaho" and 20 occurrences of keywords associated with the concept "Agriculture," may not be of primary interest to a user that is looking for segments that relate to both concepts "Idaho" and Agriculture" in view of the largely segmented discussion of keywords associated with those concepts (and even though the keywords occurrences for each concept are equal across the entire segment).

One method of determining intersection of concepts and/or weighting scheme is using a geometric mean function. For example, a concept to segment ranking may be determined by a geometric mean of positive concepts (keywords and/or terms from a segment matching the query), which may be subtracted by negative concepts (keywords and/or terms from a segment not matching the query), which is described in further detail below. Another aspect of concept ranking is that a segment is more "pure" when there are less or zero concepts in the segment that are not one of the one or more specified search concepts.

The method of FIG. 12 may be performed by the concept indexing system 500 of FIG. 5, such as the various components of FIG. 5 that are discussed above, including concept service 504 and/or presentation module 506. Depending on the embodiment, the method of FIG. 12 may include fewer or additional blocks and/or the blocks may be performed in order different than is illustrated.

Beginning at block 1202, presentation module 506 accesses and/or receives the specified search concepts. For example, presentation module 506 may receive a search query for the two concepts of California and technology. In the example, presentation module 506 processes the segments that relate to both concepts, as described below.

At block 1204, presentation module 506 determines the respective weights of search concepts in the one or more segments. For example, positive concepts may include concepts and/or segments that match the search query. As described herein, concepts matching a segment and/or the weights of the search concepts may be based on one or more related keywords, the density of keywords, the distribution of keywords, the aboutness of a concept in a segment, the distribution ratio, and/or based on other methods.

Presentation module 506 may determine respective weights of search concepts based on methods related to term frequency. One such method that may be used is term frequency-inverse document frequency ("TF-IDF"). Generally, TF-IDF is a numerical statistic and/or weighting scheme that reflects how important terms are in a collection. Term frequency ("TF") may refer to the number of times that terms and/or keywords associated with a particular search concept occurs in a segment. Inverse document frequency ("IDF") may refer to a measure of how common or rare the terms and/or keywords are across the library of segments. One example inverse document frequency formula that may be used is:

$$IDF = \log\left(\frac{\text{total number of segments}}{\text{number of segments with the terms}}\right)$$

One example calculation to determine TF-IDF weights is to multiply the TF by IDF. In some embodiments, TF-IDF may be used by the concept indexing system for ranking and/or searching of titles and/or headers. However, in some embodiments, where TF-IDF is used, if two search concepts appear in all or the same number of segments then the two search concepts will be treated the same by the inverse document frequency weighting scheme. For example, if "US" and "Microprocessor" appear in all of the segments, but "US" occurs ten times and "Microprocessor" only occurs five times, then TF-IDF may assign the same weight to both search concepts even though the "Microprocessor" search concept is rarer and/or likely the most important search concept. In some embodiments, a concept weighting scheme and/or process may be used instead of TF-IDF that can differentiate between search concepts that show up in the same number of segments but a different number of times. A concept weighting process may be based on term frequency and metadata and/or histogram data associated with respective search concepts. Methods and techniques for concept weighting are described in further detail with respect to FIGS. 13 and 14.

At block 1206, presentation module 506 determines the respective weights of other concepts in the one or more segments. In some embodiments, determining weights of the other concepts in the one or more segments may be similar to block 1204. For example, the weights of the other concepts may be based on the sum of the weights of the individual "other" concepts. For example, similar to the weights of positive concepts, the weights of other concepts may be based on the one or more other keywords, the density of keywords, the distribution of keywords, the "aboutness" of a concept in a segment, the distribution ratio, and/or based on other methods.

At block 1208, presentation module 506 may optionally access and/or retrieve a purity constant. For example, the purity constant may be referred to as $\partial$ below. In some embodiments, the purity constant may be used by the concept indexing system to determine the ratio and/or pureness of search concepts in a segment, which is described in greater detail below. The purity constant and/or $\partial$ may indicate the balance between the search concepts and other concepts in determining the concept intersection ranking. In other words, $\partial$ may indicate how much a user cares about pureness of concepts. In some embodiments, $\partial$ may be determined by a user, and/or may be configured based on the particular collection and/or library of segments (e.g., some libraries may generally contain relatively long or short articles), such as the relative length of segments in the library, and/or $\partial$ may be configurable. In some embodiments, the purity constant and/or $0\partial$ may be a value between zero and one.

At block 1210, presentation module 506 may generate a score and/or rank based on the purity constant, weights of the search concepts in the segment, and/or weights of the other concepts in the segment. For example, presentation module 506 and/or concept indexing system may use the following formula to determine concept intersection ranking:

rank=($\partial$*geometric mean(positive concepts)*number of positive concepts) −(1−$\partial$)*sum(other concepts)

The geometric mean may refer to a type of mean or average, which indicates the central tendency and/or typical value of a set of numbers by using the product of their values (as opposed to the arithmetic mean which uses their sum). The geometric mean may also refer to the nth root of the product of n numbers. A geometric mean may be advantageous in determining intersections of concepts because the geometric mean may encourage similar weighting for both terms and/or concepts. In other words, the highest weight may be achieved when the term weights are equal (for example, one term being twice the weight). Based on the above concept intersection ranking formula, if $\partial$ is one, a high number, and/or infinite, then the purity of segments may be very high, in other words, other concepts may not be allowed in the search results of the concept indexing system. At the other extreme, if $\partial$ is zero, then the ranking of segments may be based solely on the other concepts. In some embodiments, where $\partial$ is set to a number and/or value such as 0.7, 0.8, 0.9, etc., then the concept indexing system may prioritize documents that are predominantly about the positive and/or search concepts, however, the concept indexing system may allow for a smattering of other topics and/or concepts within the identified segments.

Additionally or alternatively, the concept indexing system may use other weighting schemes than a geometric mean to determine concept intersection ranking. Non-limiting examples of weighting schemes, algorithms, and/or formulas include Gini impurity and/or information gain. An example Gini impurity algorithm includes summing the probability of each item being chosen times the probability of a mistake in categorizing that item. Gini impurity may reach its minimum (zero) when all cases in the node (in a decision tree, for example) fall into a single target category. Gini impurity may be calculated (where $f_i$ is the fraction of items labeled with value i in the set) by:

Gini impurity$(f) =$ $$\sum_{i=1}^{m} f_i(1-f_i) = \sum_{i=1}^{m} (f_i - f_i^2) = \sum_{i=1}^{m} f_i - \sum_{i=1}^{m} f_i^2 = 1 - \sum_{i=1}^{m} f_i^2$$

Information gain in determining concept intersection rankings may be based on entropy. An example information equation and/or formula may include:

$$\text{Information gain}(f) = -\sum_{i=1}^{m} f_i \log_2 f_i$$

In some embodiments, the concept indexing system and/or concept service 504 may pre-compute and/or cache the concept intersection rankings for segments in concept data store 508. For example, concept service 504 may execute process 1200 to store the various rankings of concepts and/or permutations of concept combinations in concept data store 508. In some embodiments, caching and/or pre-computation of concept intersection rankings may be advantageous to provide faster query response times to the user.

Figure 13:
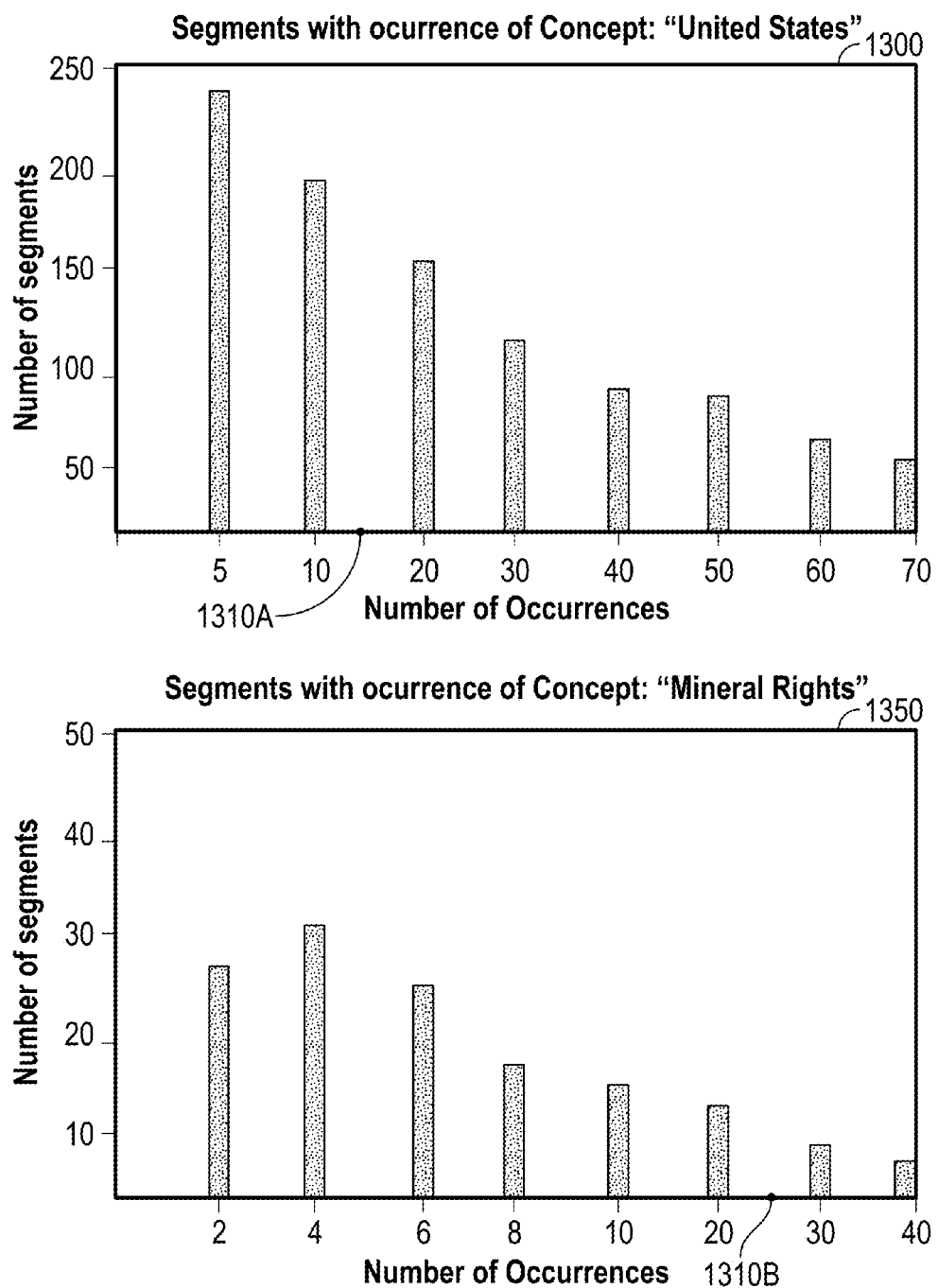
FIG. 13 are diagrams illustrating example metadata and/or histogram data for search concepts, according to some embodiments of the present disclosure.

FIG. 13 includes diagrams illustrating example metadata and/or histogram data for concepts, according to some embodiments of the present disclosure. Example diagram 1300 illustrates metadata and/or histogram data associated with a particular concept, such as "United States." For example, the horizontal axis of diagram 1300 corresponds to the number of occurrences of terms and/or keywords associated with a concept and the vertical axis of diagram 1300 corresponds to the number of segments. Thus, diagram 1300 illustrates the number of segments that include a particular number of occurrences of terms and/or keywords associated with the concept "United States." Example diagram 1350 is similar to diagram 1300 except that diagram 1350 is for the concept "Mineral Rights" instead of "United States." The metadata and/or histogram data of diagram 1350 may be contrasted with the histogram data of diagram 1300 because "Mineral Rights" may be a rarer concept than "United States" as illustrated by diagrams 1350 and 1300. As discussed in further detail herein, the concept indexing system, presentation module 506, and/or concept service 504 may use the histogram data for concept weighting and/or ranking, such as determining the weights for concepts during a search of segments based on input from a user specifying multiple search concepts.

Figure 14:
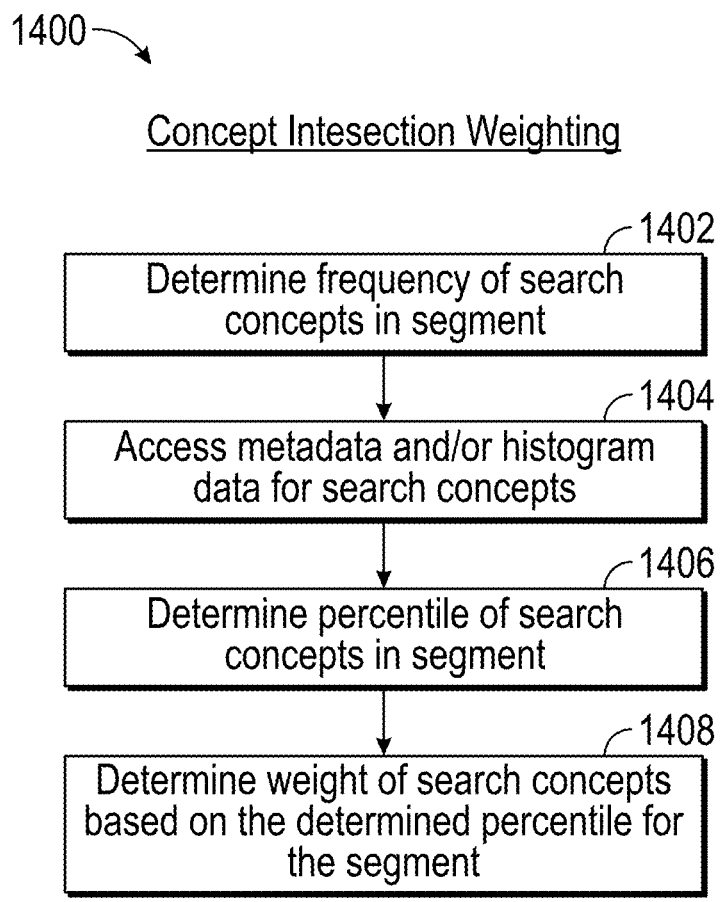
FIG. 14 is a flowchart illustrating an example concept intersection weighting process, according to some embodiments of the present disclosure.

FIG. 14 is a flowchart illustrating an example concept intersection weighting process 1400, according to some embodiments of the present disclosure. The method of FIG. 14 may be performed by the concept indexing system 500 of FIG. 5, such as the various components of FIG. 5 that are discussed above, including concept service 504 and/or presentation module 506. Some or all of the blocks of process 1400 may be executed as part of another process, such as at block 1204 of process 1200 of FIG. 12, which may determine the weights of search concepts. For example, presentation module 506 may execute process 1400 as a part of process 1200 after two or more selected concepts are received in a search query, as illustrated in user interface 100 of FIG. 1. Thus, process 1400 may determine rankings for multiple segments as they are applicable to the combination of the two or more selected concepts. Depending on the embodiment, the method of FIG. 14 may include fewer or additional blocks and/or the blocks may be performed in order different than is illustrated.

Beginning at block 1402, presentation module 506 may determine the frequency of search concepts in one or more segments. As described herein, frequency and/or term frequency may refer to the number of times terms and/or keywords associated with a particular search concept appears in a segment.

At block 1404, presentation module 506 may access metadata and/or histogram data for the search concepts. For example, metadata and/or histogram data associated with search concepts may be illustrated by diagrams 1300 and 1350 of FIG. 13. In some embodiments, the metadata and/or histogram data or search concepts may be loaded into memory, such as the memory module 1908 of the concept indexing system 500.

At block 1406, presentation module 506 may determine a percentile and/or ranking of the search concepts to segments based on the metadata and/or histogram data. In some embodiments, presentation module 506 iterates through a collection of segments and determines the percentile rankings of search concepts for each segment of the collection of segments. For example, assume the accessed and/or received search concepts are "United States" and "Mineral Rights." Continuing with the example, diagrams 1300 and 1350 of FIG. 13 illustrate the respective percentiles of the two search concepts for the library of segments. More specifically, presentation module 506 iterates through a collection of queried segments to identify the percentiles of a particular segment, segment 1310A-B. In particular, the example diagram 1300 of FIG. 13 illustrates that segment 1310A has approximately 13 occurrences of terms and/or keywords associated with the search concept "United States." Moreover, histogram data of diagram 1300 further indicates a ranking and/or percentile of segment 1310A within the collection as being within the $30^{th}$ percentile of segments containing the search concept "United States," for example. As mentioned, in this example segment, 1310A is similar to segment 1310B except that segment 1310B within diagram 1350 indicates the number of occurrences of a different search concept within segment 1310A-B. For example, segment 1310B of diagram 1350 indicates that segment 1310B is within the $90^{th}$ percentile of segments containing the search concept "Mineral Rights."

At block 1408, presentation module 506 may determine the weight for multiple search concepts based on the respective determined percentiles for the search concepts in the segment. Continuing with the example from above, for the same segment 1310A-B, presentation module 506 may assign a higher weight to search concept "Mineral Rights" than search concept "United States" because of the higher percentile ranking of the search concept "Mineral Rights." In some embodiments, the weighting of particular search concepts may be determined by multiplying term frequency by the determined percentile. For example, presentation module 506 may access data corresponding to diagrams 1300 and 1350, and determine a weighting of the $30^{th}$ percentile of 14 keywords (0.3*14 keywords or 4.2) for "United States" and a weighting of $90^{th}$ percentile of 25 keywords (25*0.9 or 22.5) for "Mineral Rights" for the segment 1310A-B. Continuing with the example and according to some embodiments herein, another segment with weightings of 5 and 4.2 for "United States" and "Mineral Rights" would have a lower ranking than segment 1310A-B. As described herein, the metadata and/or histogram data may indicate how common or rare search concepts are to determine their importance during search queries. Thus, weights for search concepts may be properly scaled based on their respective histogram data. The determination of weights for search concepts by process 1400 may be combined with the geometric mean calculation to determine concept intersection rankings as described with respect to process 1200 of FIG. 12. In some embodiments, the histogram-based ranking of search results, as described herein, may be used for searches of a single concept. Thus, presentation module 506 may implement process 1400 to determine respective weights for search concepts during concept intersection ranking by using metadata, empirical distributions, and/or histogram data.

FIG. 15 illustrates an example document 1500 that may be processed and/or analyzed by the concept indexing system and/or another module or service described herein. Document 1500 may be processed by the concept service 504 by executing any of the processes described herein, such as process 600 of FIG. 6, process 1100 of FIG. 11, and/or process 1200 of FIG. 12.

Additionally or alternatively to process 1200 of FIG. 12, presentation module 506 may rank segments for the intersection of multiple concepts based on determining a statistical likelihood that the multiple concepts are conceptually related in a segment. For example, as illustrated by segment 1510 of FIG. 15, concept service 504 may process the document 1500 to identify keywords 1502A-I and 1504A-E. Keywords 1502A-I may correspond to the search concept "Mineral Rights" and keywords 1504A-E may correspond to the search concept "United States." Presentation module 506 may process a multiple search concept request by ranking segment 1510 based on the position and/or distribution of keywords within segment 1510. An example method for determining a statistical indicator of conceptual relatedness may be an average distance, such as a distance in words, between keywords associated with respective concepts from the multiple concept search request. For example, there may be three words between keyword "law" 1502A (associated with concept "Mineral Rights") and keyword "Alaska" 1504B (associated with concept "United States"), twenty-four words between keyword "Alaska" 1504B (associated with concept "United States") and keyword "coal" 1502B (associated with concept "Mineral Rights"), etc. In some embodiments, segments with lower average word distances may be ranked as more conceptually related by presentation module 506. Another example method for determining a statistical indicator of the relatedness of two or more concepts may be by breaking the segment into portions and determining how many portions and/or a percentage of the segment that have keywords associated with two or more search concepts. In some embodiments, the portion sizes may be a configurable length such as ten, thirteen, or twenty words. For example, presentation module 506 may determine that portion 1506, consisting of thirteen words, has two concepts present ("Mineral Rights" and "United States"), while portion 1508 does not have any keywords associated with the current search concepts ("Mineral Rights" and "United States"). If the remainder of the segment was similar to portions 1506 and 1508, the presentation module may assign a conceptual relatedness ranking of 0.5 to the segment because half of the portions had terms associated with the search concepts. Thus, in some embodiments, the concept indexing system may use one or more methods, such as average distance and/or breaking the segment into portions, for generating a statistical likelihood that a segment is "about" two or more search concepts.

Figure 16:
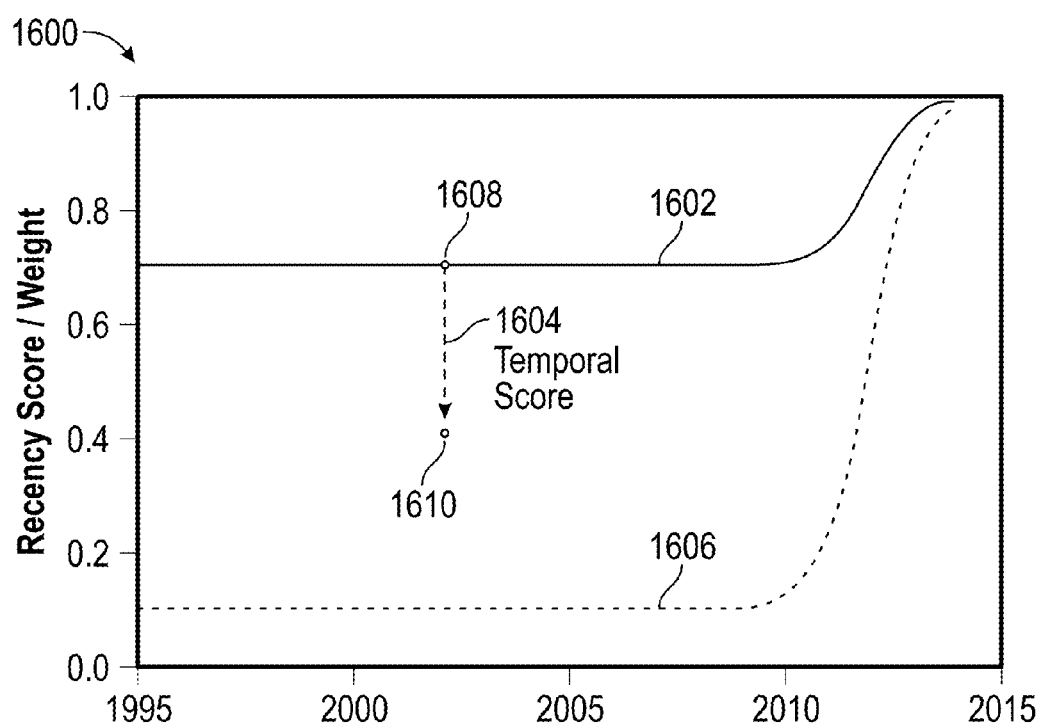
FIG. 16 is a diagram illustrating example decay functions to determine a recency score, according to some embodiments of the present disclosure.

FIG. 16 is a diagram illustrating example decay functions to determine a recency score, according to some embodiments of the present disclosure. Example diagram 1600 may illustrate how decay functions may be used to rank search results in a concept indexing system. For example, the concept results indexing system and/or data store may include a large collection of documents and/or segments spanning many months or years, such as thirty, forty, fifty, a hundred years, etc. Thus, it may be advantageous for the concept indexing system to present more recent results and/or segments more frequently and/or with higher rankings. In some embodiments, the publication date of a segment may be used to determine the recency, freshness, and/or staleness of a segment. One approach to achieving this result is to use a decay function, such as a logistic function that prioritizes more recent results and decays older results based on an input date. However, as described herein, there may be at least two types of documents and/or segments in a library, such as segments that are more basic and/or fundamental in contrast with more temporal segments. Thus, using a single logistic decay function, for example, may be disadvantageous in not being able to distinguish between the two or more types of segments. For example, a user may be more interested in a segment that includes more fundamental topics related to a provided concept, even if it is older, so long as the segments isn't specific to that time period (e.g., includes ideas or analysis that may be outdated). Therefore, improved decay functions may take into account different types of documents, which is in contrast with a single decay function that may be too blunt of an instrument. However, in other embodiments, using a single decay function may be sufficient for the particular use case and/or requirements of a group and/or set of users.

One example of an improved recency and decay function is illustrated by diagram 1600. In this example, for a particular segment an initial recency score 1608 may be determined based on a decay function 1602. In some embodiments, an input to the decay function 1602 may be a date, such as the publication date and/or some other date associated with the segment, for example. The initial recency score 1608 may be adjusted by a temporal score 1604. The temporal score 1604 may indicate how "temporal" a segment is, which may be based on the number of temporal words in the segment, which will be discussed in further detail with reference to FIG. 18 below. A final recency score 1610 a segment may be determined based on adjusting and/or subtracting the initial recency score 1608 by the temporal score 1604. A second decay function 1606 may function as a floor of the recency score. For example, if the temporal score of the segment is very high, then adjusting the recency score by the temporal score may cause the recency score to be close to zero, such as 0.0001 (without a floor). Thus, the second decay function 1606 may establish an absolute minimum recency score for the particular input date and/or time. In other words, using a floor function may indicate that no matter how "temporal" a segment is, the segment should have some threshold level of relevance to a user. For example, a user may be interested in a particular event that is associated with the date and a response to the user query may include the result (even though it may be lower ranked compared to other results).

Figure 17A:
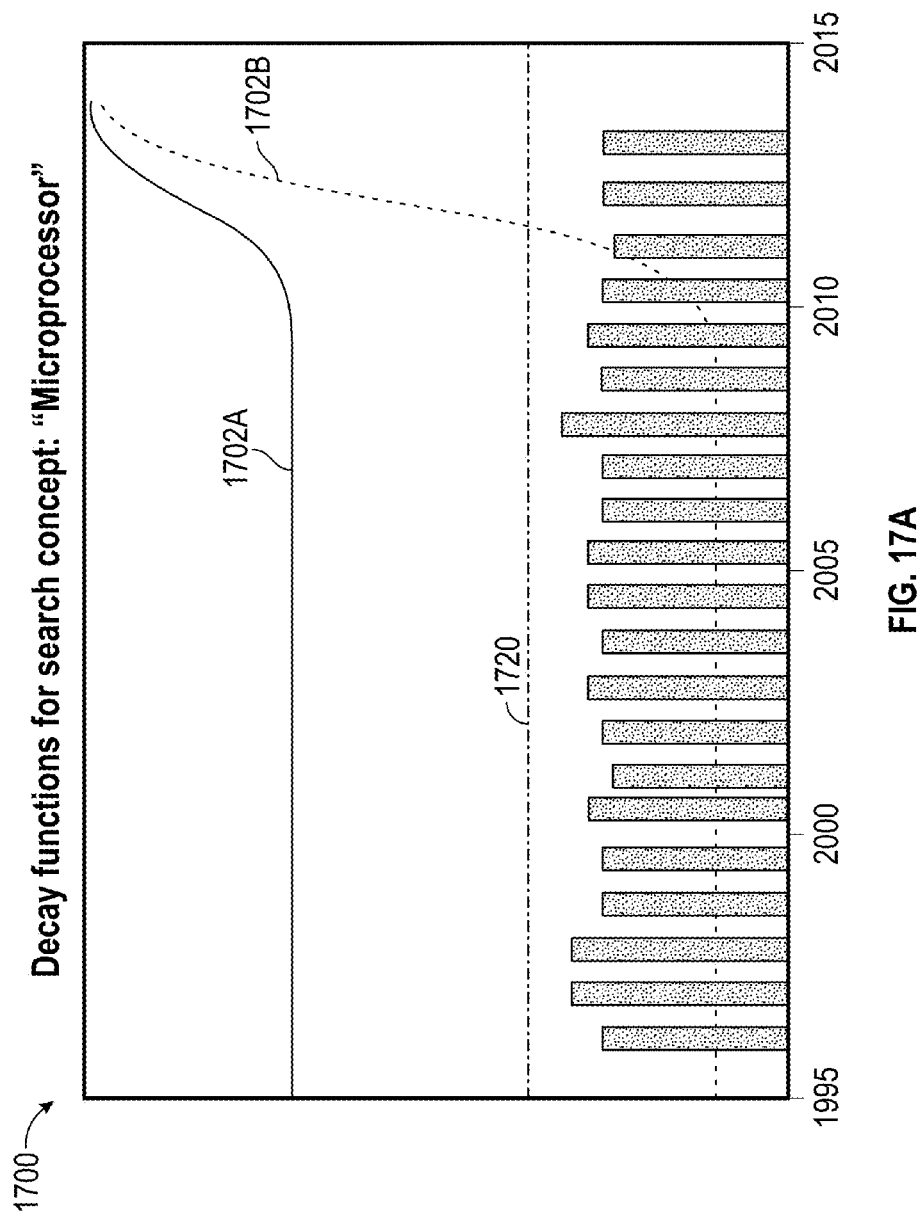
FIGS. 17A-B are diagrams illustrating additional example decay functions to determine a recency score, according to some embodiments of the present disclosure.
Figure 17B:
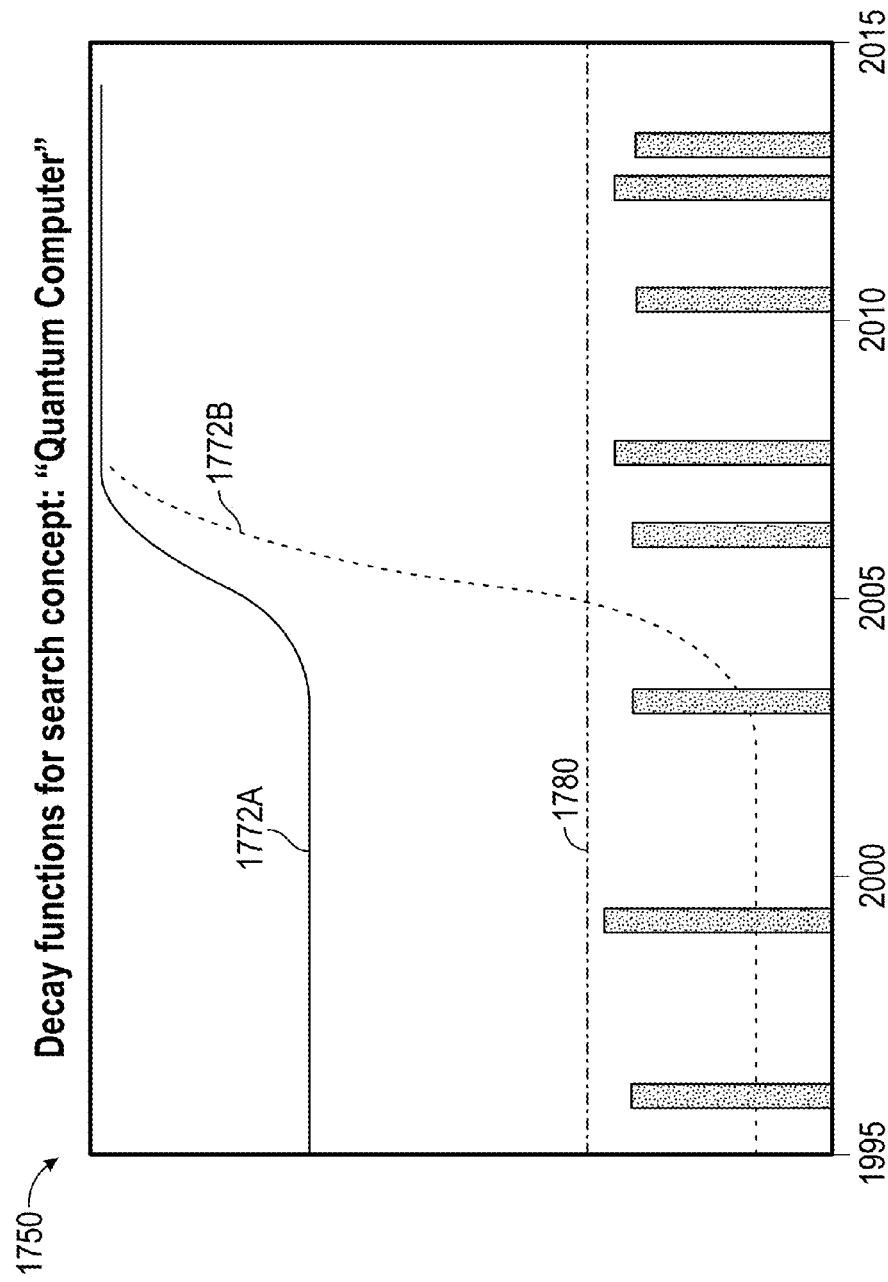

FIGS. 17A and 17B are diagrams illustrating alternate example logistic and/or decay functions to determine a recency score, according to some embodiments of the present disclosure. In the example diagrams 1700 and 1750, decay functions 1702A-B and 1772A-B may be similar to decay functions 1602 and 1606 of FIG. 16. However, the concept indexing system and/or concept service may use different decay functions based at least on metadata and/or histograms regarding the density and/or frequency of particular concepts within segments. Metadata and/or histograms 1720 and 1780 may indicate the number of segments per time unit that include, match, and/or associated with the search concept. For example, metadata and/or histogram 1720 may indicate the number of segments per time unit that include, match, and/or associated with the search concept "Microprocessor." In the example, the histogram data may indicate that segments associated with "Microprocessor" include 100 segments for December 2001, 110 segments for January 2002, 115 segments for February 2002, etc. Example metadata and/or histogram 1780 may indicate a lower density or frequency and/or a "rarer" search concept, "Quantum Computer" within the segments. Thus, the concept indexing system and/or concept service may use a different decay function based on a particular search concept and its corresponding metadata and/or histogram data. As illustrated, the decay functions 1772A-B, which corresponds to the search concept "Quantum Computer," may be more lenient than decay functions 1702A-B because of the "rarity" of the search concept "Quantum Computer." In contrast, the search concept "Microprocessor" may be more ubiquitous among segments and the concept indexing system and/or concept service may use less lenient decay functions 1702A-B.

Figure 18:
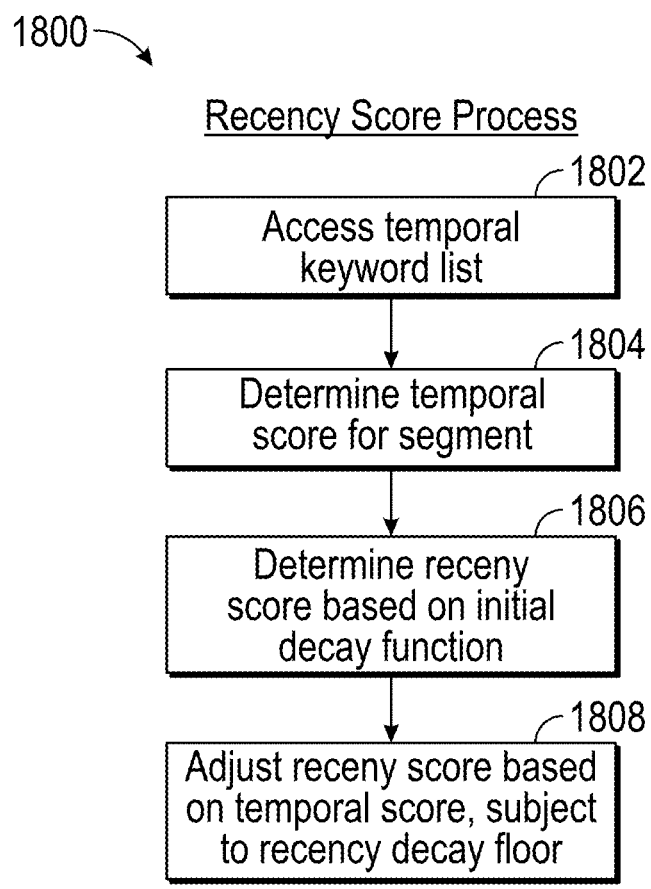
FIG. 18 is a flowchart illustrating an example recency scoring process, according to some embodiments of the present disclosure.

FIG. 18 is a flowchart illustrating an example recency scoring process 1800, according to some embodiments of the present disclosure. The method of FIG. 18 may be performed by the concept indexing system 500 of FIG. 5, such as the various components of FIG. 5 that are discussed above, including concept service 504 and/or presentation module 506. For example, concept service 504 may implement process 1800 to measure the temporalness of a segment by evaluating the percentage and/or number of "time-bound" and/or temporal words in the segment, such as "current," "yesterday," "Tuesday," "March," "2007" in the text, for example. Concept service 504 may use a percentage and/or recency score to choose a point between two decay functions illustrated in FIG. 16, where one function may be more aggressive and the other one much more lenient. The decay functions may be viewed as priors on confidence of relevance of old segments and newer segments. As described herein, older more fundamental and/or basic segments are much more likely to be relevant to and/or of interest to a user than older temporal segments. Depending on the embodiment, the method of FIG. 18 may include fewer or additional blocks and/or the blocks may be performed in order different than is illustrated.

Beginning at block 1802, concept service 504 accesses a list of temporal words and/or keywords. Temporal keywords may be words associated with time, such as a date, time of day, week, month, or year. Non-limiting example temporal keywords include "current," "yesterday," "Tuesday," "March," "2007," "Jan. 1, 1998," "2014-Dec.-2," or any other word and/or text associated with time. In some embodiments, an initial temporal keyword list may be selected and/or determined by a user. In some embodiments, the machine learning techniques described herein may be used by concept service 504 to improve the temporal keyword list. For example, segments matching the initial keyword list may be used as a training set to generate an expanded list of temporal keywords.

At block 1804, concept service 504 determines a temporal score for the segment. The temporal score and/or measurement of the temporalness of the segment may be based on the density of temporal words in the segment. An example ratio and/or equation to determine the temporal density of the segment is a number and/or quantity of temporal words divided by segment length. As used herein, segment length may be the number of words in her characters in the segment.

At block 1806, concept service 504 may determine an initial recency score based on an initial decay function. For example, the initial decay function may be a logistic function, such as the decay function 1602 of FIG. 16. Thus, if a segment has a publication date in the year 2002, for example, then concept service 504 may assign an initial recency score 1608 to the segment of approximately 0.7 as illustrated in FIG. 13A.

At block 1808, the recency score may be adjusted based on a temporal score, which may be subject to a recency decay floor. Concept service 504 may adjust the recency score based on the temporal score determined in block 1804. In some embodiments adjusting the recency score may include subtracting the initial recency score, determined at block 1806, by the temporal score. However, concept service 504 may adjust the recency score subject to a second decay function, which may act as a floor. For example, as illustrated in FIG. 16, the second decay function 1606 may act as a floor and/or minimum for the final recency score. For example, for a segment with a date older than 2009 the lowest recency score the segment may receive may be approximately 0.1. In other embodiments, adjusting the recency score and/or determining a final recency score may include selecting a point between the two decay functions based on the temporal score.

In some embodiments, concept service 504 may use other decay functions and/or combinations of decay functions. While two decay functions are used as an example herein, in some embodiments, concept service 504 may use more than two decay functions to rank and/or score segments. For example, n types and/or categories of segments (e.g., fundamental, temporal, news article, treatise, research paper, etc.) may be associated with n recency decay functions. In some embodiments, the temporal scoring and/or logistic decay functions may be configurable by a user. For example, a user may specify and/or indicate the importance of temporal segments and the concept indexing system's decay functions and/or process 1800 may be adjusted based on user preferences. In some embodiments, instead of adjusting a recency score by the temporal score the temporal score may be used by concept service as a threshold and/or indicator for selecting between or among two or more recency decay functions to calculate a recency score for a segment with the selected recency decay function.

In some embodiments, concept service 504 may select and/or determine decay functions based on metadata associated with particular search concepts. As described herein, metadata and/or histogram data may include the number of segments associated with a particular search concept appear per some time unit as illustrated by histogram data 1700 and 1750 of FIGS. 17A and 17B, respectively. Concept service 504 may access and/or select pre-existing decay functions based on the respective histogram data for a particular search concept. For example, concept service 504 may choose between the decay function set 1702A-B or the decay function set 1772A-B of FIGS. 17A and 17B, respectively, based on their respective histogram data being within one or more pre-existing thresholds. In other embodiments, concept service 504 may dynamically determine decay functions based on the histogram data. For example, concept service 504 may determine decay functions 1702A-B and 1772A-B by starting with one or more base decay functions, such as decay functions 1602 and 1606 of FIG. 16, and adjusting the one or more base decay functions based on respective histogram data. Continuing with the example, concept service 504 may adjust a base decay function to be more lenient based on the histogram data indicating a rarer search concept and/or may adjust the base decay function to be more strict based on the histogram data indicating a more common search concept among segments. In some embodiments, concept service 504 may determine a multiplication factor based on the histogram data. The concept service 504 may then adjust the base decay function by multiplying the base function by the determined factor. Thus, concept service 504 may determine customized decay functions for particular search concepts, such as customizing decay functions based on the density of segments for particular search concepts.

In some embodiments, instead of a decay based on time, decay functions may be used for other metadata associated with segments. A logistic decay function may be used by the concept indexing system for term decay and/or segment length decay. For example, a shorter paragraph and/or segment may have a very high ranking and/or scoring for a particular search concept. However, users may not be interested in the shorter segments, and similar to decay functions based on time, if a segment is below a particular length and/or word count threshold, the ranking of the segment may drop dramatically based on a decay term function. In some embodiments, a single and/or multiple term logistic decay functions may be used by the concept indexing system to rank documents. Also, similar to time decay that may be configurable, term decay may also be configurable by the user.

Implementation Mechanisms

The various computing device(s) discussed herein, such as the concept indexing system 500, concept service 504, presentation module 506, and/or user computing device 502, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The concept indexing system 500 may be hosted and/or executed on one or more computing devices with one or more hardware processors and with any of the previously mentioned operating system software.

Figure 19:
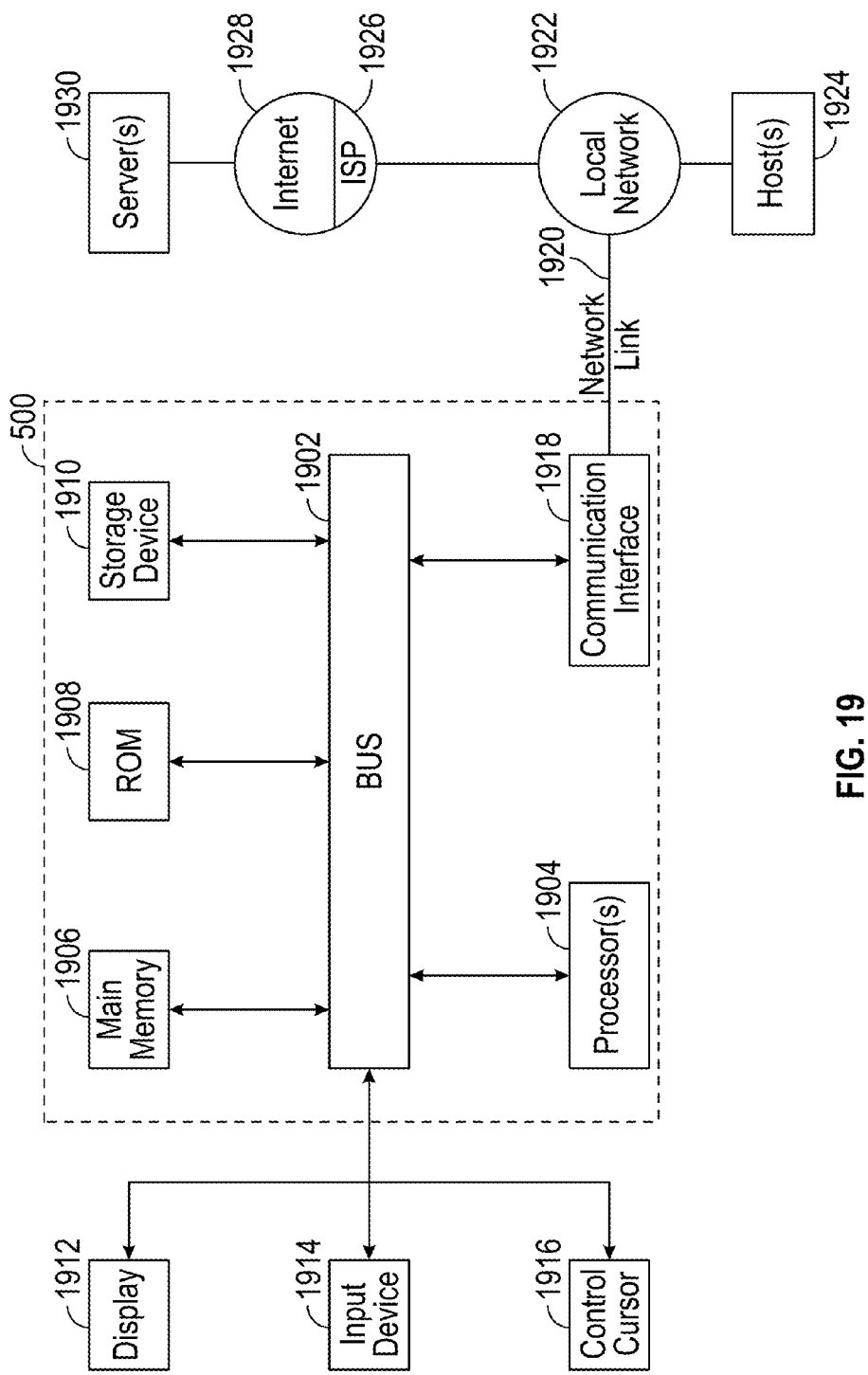
FIG. 19 is a diagram illustrating a computer system with which certain embodiments discussed herein may be implemented.

FIG. 19 is a block diagram that illustrates example components of the concept indexing system 500. While FIG. 19 refers to the concept indexing system 500, any of the other computing devices, modules, services, and/or user computing devices discussed herein may have some or all of the same or similar components.

The concept indexing system 500 may execute software, e.g., standalone software applications, applications within browsers, network applications, etc., whether by the particular application, the operating system, or otherwise. Any of the systems discussed herein may be performed by the concept indexing system 500 and/or a similar computing system having some or all of the components discussed with reference to FIG. 19.

The concept indexing system 500 includes a bus 1902 or other communication mechanism for communicating information, and a hardware processor, or multiple processors, 1904 coupled with bus 1902 for processing information. Hardware processor(s) 1904 may be, for example, one or more general purpose microprocessors.

The concept indexing system 500 also includes a main memory 1906, such as a random access memory (RAM), cache and/or other dynamic storage devices, coupled to bus 1902 for storing information and instructions to be executed by processor(s) 1904. Main memory 1906 also may be used for storing temporary variables or other intermediate information during execution of instructions to be executed by processor(s) 1904. Such instructions, when stored in storage media accessible to processor(s) 1904, render the concept indexing system 500 into a special-purpose machine that is customized to perform the operations specified in the instructions. Such instructions, as executed by hardware processors, may implement the methods and systems described herein for indexing documents and/or segments.

The concept indexing system 500 further includes a read only memory (ROM) 1908 or other static storage device coupled to bus 1902 for storing static information and instructions for processor(s) 1904. A storage device 1910, such as a magnetic disk, optical disk, or USB thumb drive (Flash drive), etc., is provided and coupled to bus 1902 for storing information and instructions. The presentation module 506, concept service 504, and/or concept data store 504 of FIG. 5 may be stored on the main memory 1906 and/or the storage device 1910.

In some embodiments, the concept data store 504 of FIG. 5 is a file system, relational database such as, but not limited to, MySql, Oracle, Sybase, or DB2, and/or a distributed in memory caching system such as, but not limited to, Memcache, Memcached, or Java Caching System.

The concept indexing system 500 and/or user computing device 502 may be coupled via bus 1902 to a display 1912, such as a cathode ray tube (CRT) or LCD display or touch screen, for displaying information to a computer user. An input device 1914 is coupled to bus 1002 for communicating information and command selections to processor 1904. One type of input device 1914 is a keyboard including alphanumeric and other keys. Another type of input device 1914 is a touch screen. Another type of user input device is cursor control 1916, such as a mouse, a trackball, a touch screen, or cursor direction keys for communicating direction information and command selections to processor 1904 and for controlling cursor movement on display 1912. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The concept indexing system 500 may include a presentation module to implement a GUI, for example, FIGS. 1 and/or 2, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The concept indexing system 500, or components of it, such as the presentation module 506 and/or the concept service 504 of FIG. 5, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor(s) 1904 for execution. For example, the instructions may initially be carried on a magnetic disk or solid state drive of a remote computer. The remote computer may load the instructions into its dynamic memory and send the instructions over a telephone or cable line using a modem. A modem local to the concept indexing system 500 may receive the data on the telephone or cable line and use an infra-red transmitter to convert the data to an infra-red signal. An infra-red detector can receive the data carried in the infra-red signal and appropriate circuitry can place the data on bus 1902. Bus 1902 carries the data to main memory 1906, from which the processor(s) 1904 retrieves and executes the instructions. The instructions received by main memory 1906 may retrieve and execute the instructions. The instructions received by main memory 1906 may optionally be stored on storage device 1910 either before or after execution by processor(s) 1904.

The concept indexing system 500 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to be communicated with a WAN). Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from the concept indexing system 500, are example forms of transmission media.

A network, such as the network 560 of FIG. 5, may comprise, but is not limited to, one or more local area networks, wide area network, wireless local area network, wireless wide area network, the Internet, or any combination thereof.

The concept indexing system 500 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor(s) 1904 as it is received, and/or stored in storage device 1910, or other non-volatile storage for later execution.

In some embodiments, the concept indexing system 500 may operate in a distributed computing environment including several computer systems that are interconnected using one or more computer networks. The concept indexing system 500 could also operate within a computing environment having a fewer or greater number of devices than are illustrated in FIG. 5 and/or FIG. 19. Thus, the depiction of concept indexing system 500 in FIG. 5 and/or FIG. 19 should be taken as illustrative and not limiting to the present disclosure. For example, the concept indexing system 500 could implement various Web services components and/or peer-to-peer network configurations to implement at least a portion of the processes described herein. For example, multiple servers and/or processes may process documents and/or segments in a distributed manner to expedite the processing of a library and/or collection of documents.

It will be appreciated that while the present disclosure discusses concept indexing process with respect to processing and/or analyzing segments, the systems and methods described herein may be used for documents as well.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
    receiving, in a user interface, a first concept and a second concept, wherein the first concept is associated with a first plurality of related terms and the second concept is associated with a second plurality of related terms;
    querying a data store comprising a plurality of segments based at least on the first concept and the second concept to retrieve a result set, the result set comprising a first segment and a second segment from the plurality of segments;
    determining a first quantity of occurrences of the first concept in the first segment, and a second quantity of occurrences of the second concept in the first segment;
    accessing first statistical distribution data associated with occurrences of the first concept within the plurality of segments, and second statistical distribution data associated occurrences of with the second concept within the plurality of segments;
    determining a ranking of the first segment relative to the second segment by at least:
        generating a first weight by comparing the first quantity of occurrences against the first statistical distribution data;
        generating a second weight by comparing the second quantity of occurrences against the second statistical distribution data; and
        combining the first weight with the first quantity of occurrences, and the second weight with the second quantity of occurrences;
    calculating a first recency score associated with the first segment, wherein the ranking is based at least on the first recency score; and
    causing presentation, in the user interface, of the first segment relative to the second segment according to the ranking.

2. The computer-implemented method of claim 1, wherein determining the ranking of the first segment relative to the second segment further comprises:
    calculating a first value by multiplying the first quantity of occurrences and the first weight; and
    calculating a second value by multiplying the second quantity of occurrences and the second weight, wherein the ranking is based at least on the first and second values.

3. The computer-implemented method of claim 1, wherein calculating the first recency score comprises:
    determining a time associated with the first segment; and
    applying a decay function to the time to determine the first recency score.

4. The computer-implemented method of claim 3, further comprising:
    determining a quantity of temporal words within the first segment; and determining a second recency score by adjusting the first recency score based on the quantity of temporal words, wherein the ranking is further based at least on the second recency score.

5. A non-transitory computer storage medium storing computer executable instructions that when executed by a computer hardware processor perform operations comprising:
receiving, in a user interface, a first concept and a second concept, wherein the first concept is associated with a first plurality of related terms and the second concept is associated with a second plurality of related terms;
querying a data store comprising a plurality of segments to retrieve a result set based at least on the first concept and the second concept to retrieve a result set, the result set comprising a first segment and a second segment from the plurality of segments;
determining a first quantity of occurrences of the first concept in the first segment, and a second quantity of occurrences of the second concept in the first segment;
accessing first statistical distribution data associated with occurrences of the first concept within the plurality of segments, and second statistical distribution data associated with occurrences of the second concept within the plurality of segments;
determining a ranking of the first segment relative to the second segment by at least:
generating a first weight by comparing the first quantity of occurrences against the first statistical distribution data;
generating a second weight by comparing the second quantity of occurrences against the second statistical distribution data; and
combining the first weight with the first quantity of occurrences, and the second weight with the second quantity of occurrences;
calculating a first recency score associated with the first segment, wherein the ranking is based at least on the first recency score; and
causing presentation, in the user interface, of the first segment relative to the second segment according to the ranking.

6. The non-transitory computer storage medium of claim 5, wherein determining the first quantity of occurrences is based at least on a quantity of keywords associated with the first concept in the first segment.

7. The non-transitory computer storage medium of claim 5, wherein determining the ranking for the first segment relative to the second segment further comprises:
combining the first quantity of occurrences, the first weight, the second quantity of occurrences, and the second weight.

8. The non-transitory computer storage medium of claim 5, wherein calculating the first recency score further comprises:
determining a time associated with the first segment; and
applying a decay function to the time to determine the first recency score.

9. The non-transitory computer storage medium of claim 8, wherein determining the ranking for the first segment relative to the second segment further comprises:
determining a quantity of temporal words within the first segment; and
determining a second recency score by adjusting the first recency score based on the quantity of temporal words, wherein the ranking is further based at least on the second recency score.

10. The non-transitory computer storage medium of claim 8, wherein determining the ranking for the first segment relative to the second segment further comprises:
decreasing the ranking for the first segment relative to the second segment where the first recency score indicates the first segment is less recent.

11. A computer system comprising:
one or more hardware computer processors programmed, via executable code instructions, to:
receive, in a user interface, a first concept and a second concept, wherein the first concept is associated with a first plurality of related terms and the second concept is associated with a second plurality of related terms;
query data store comprising a plurality of segments based at least on the first concept and the second concept to retrieve a result set, the result set comprising a first segment and a second segment from the plurality of segments;
determine a first quantity of occurrences of the first concept in the first segment, and a second quantity of occurrences of the second concept in the first segment;
access first statistical distribution data associated with occurrences of the first concept within the plurality of segments, and second statistical distribution data associated with occurences of the second concept within the plurality of segments;
determine a ranking of the first segment relative to the second segment by at least:
generating a first weight by comparing the first quantity of occurrences against the first statistical distribution data;
generating a second weight by comparing the second quantity of occurrences against the second statistical distribution data; and
combining the first weight with the first quantity of occurrences, and the second weight with the second quantity of occurrences;
calculate a first recency score associated with the first segment, wherein the ranking is based at least on the first recency score; and
cause presentation, in a user interface, of the first segment and the second segment, wherein the presentation indicates the ranking.

12. The computer system of claim 11, wherein determining the first quantity of occurrences is based at least on a quantity of keywords associated with the first concept in the first segment.

13. The computer system of claim 11, wherein determining the ranking for the first segment relative to the second segment further comprises:
combining the first quantity, the first weight, the second quantity, and the second weight.

14. The computer system of claim 11, wherein calculating the first recency score further comprises:
determining a time associated with the first segment; and
applying a decay function to the time to determine the first recency score.

15. The computer system of claim 14, wherein determining the ranking for the first segment relative to the second segment further comprises:
determining a quantity of temporal words within the first segment; and determining a second recency score by lowering the first recency score by the quantity of temporal words, wherein the ranking is further based at least on the second recency score.

16. The computer system of claim 14, wherein determining the ranking for the first segment relative to the second segment further comprises:

decreasing the ranking for the first segment relative to the second segment where the first recency score indicates the first segment is less recent.

17. The computer system of claim 11, wherein determining the ranking for the first segment relative to the second segment is further based at least on a relationship R, wherein relationship R is defined substantially as:

$$\alpha * \text{geometric mean } (P) * \text{quanity of } P - (1-\alpha) * \text{sum}(O),$$

where $\alpha$ is a constant,

P comprises a first density of at least the first concept and the second concept in the first segment based on the first and second weights, and O comprises a second density of one or more other concepts in the first segment, wherein the one or more other concepts do not include at least the first concept and the second concept.

\* \* \* \* \*